(12) United States Patent
Sirkar et al.

(10) Patent No.: US 12,121,860 B2
(45) Date of Patent: Oct. 22, 2024

(54) HOLLOW FIBER MEMBRANE MODULE FOR DIRECT CONTACT MEMBRANE DISTILLATION-BASED DESALINATION

(71) Applicants: New Jersey Institute of Technology, Newark, NJ (US); Applied Membrane Technology, Inc., Minnetonka, MN (US)

(72) Inventors: Kamalesh Sirkar, Bridgewater, NJ (US); Dhananjay Singh, Kearny, NJ (US); Lin Li, Kearny, NJ (US); Thomas J. McEvoy, Tofte, MN (US)

(73) Assignees: New Jersey Institute of Technology, Newark, NJ (US); Applied Membrane Technology, Inc., Minnetonka, MN (US)

( * ) Notice: Subject to any disclaimer, the term of this patent is extended or adjusted under 35 U.S.C. 154(b) by 51 days.

(21) Appl. No.: 18/085,724

(22) Filed: Dec. 21, 2022

(65) Prior Publication Data

US 2023/0149855 A1     May 18, 2023

Related U.S. Application Data

(62) Division of application No. 16/607,015, filed as application No. PCT/US2018/028860 on Apr. 23, 2018, now Pat. No. 11,534,720.

(Continued)

(51) Int. Cl.
    *B01D 61/36*         (2006.01)
    *B01D 63/02*         (2006.01)
    (Continued)

(52) U.S. Cl.
    CPC ....... *B01D 61/366* (2013.01); *B01D 61/3641* (2022.08); *B01D 63/02* (2013.01);
    (Continued)

(58) Field of Classification Search
None
See application file for complete search history.

(56) References Cited

U.S. PATENT DOCUMENTS 4,227,295 A    10/1980   Bodnar et al.
5,102,550 A     4/1992   Pizzino et al.
(Continued)

FOREIGN PATENT DOCUMENTS

WO     2018195534     10/2018

OTHER PUBLICATIONS

Search Report and Written Opinion in International Application No. PCT/US2018/28860 dated Aug. 9, 2018.
(Continued)

*Primary Examiner* — Krishnan S Menon
(74) *Attorney, Agent, or Firm* — Billion & Armitage

(57) ABSTRACT

Exemplary embodiments in desalination by direct contact membrane distillation present a cylindrical cross-flow module containing high-flux composite hydrophobic hollow fiber membranes. The present embodiments are directed to a model that has been developed to describe the observed water production rates of such devices in multiple brine feed introduction configurations. The model describes the observed water vapor production rates for different feed brine temperatures at various feed brine flow rates. The model flux predictions have been explored over a range of hollow fiber lengths to compare the present results with those obtained earlier from rectangular modules which had significantly shorter hollow fibers.

12 Claims, 19 Drawing Sheets

Related U.S. Application Data

(60) Provisional application No. 62/488,437, filed on Apr. 21, 2017.

(51) Int. Cl.
*B01D 63/04* (2006.01)
*C02F 1/44* (2023.01)
*C02F 103/08* (2006.01)

(52) U.S. Cl.
CPC .............. *B01D 63/04* (2013.01); *C02F 1/447* (2013.01); *B01D 2313/10* (2013.01); *B01D 2313/12* (2013.01); *B01D 2313/21* (2013.01); *B01D 2315/10* (2013.01); *B01D 2325/38* (2013.01); *C02F 2103/08* (2013.01)

(56) References Cited

U.S. PATENT DOCUMENTS

| | | | |
|---|---|---|---|
| 5,264,171 A | 11/1993 | Prasad et al. | |
| 6,136,073 A * | 10/2000 | Coan ..................... | B01D 63/02 210/321.89 |
| 6,309,550 B1 | 10/2001 | Iversen et al. | |
| 7,628,916 B2 | 12/2009 | Taylor et al. | |
| 7,641,795 B2 | 6/2010 | Taylor et al. | |
| 7,803,274 B2 | 9/2010 | Taylor | |
| 2001/0042716 A1 | 11/2001 | Iverson | |
| 2006/0076294 A1 | 4/2006 | Sirkar et al. | |
| 2007/0107884 A1 | 5/2007 | Sirkar et al. | |
| 2009/0152184 A1 | 6/2009 | Liao et al. | |
| 2011/0031100 A1 | 2/2011 | Qtaishat et al. | |
| 2011/0259822 A1 | 10/2011 | Al-Jlil et al. | |
| 2011/0284444 A1 | 11/2011 | Chen et al. | |
| 2013/0071594 A1 | 3/2013 | Bikson et al. | |
| 2014/0263061 A1 | 9/2014 | Taylor et al. | |
| 2014/0305789 A1 | 10/2014 | Lowenstein | |
| 2016/0220960 A1 * | 8/2016 | Lashkari .............. | B01D 61/364 |
| 2017/0173536 A1 | 6/2017 | Nagata et al. | |
| 2017/0368506 A1 | 12/2017 | Mitra et al. | |

OTHER PUBLICATIONS

Lawson, K.W., D.R. Lloyd, Membrane distillation—review. J. Membr.Sci.124 (1-5) (1997) 1-25.

Drioli, E., E. Curcio, G. Profio, State of the art and recent progresses in membrane contactors, Chem. Eng. Res. Des. 33(3) (2005) 223-233.

Lee, H., F. He, L. Song, J. Gilron, K. K. Sirkar, Desalination with a cascade of cross-flow hollow fiber membrane distillation devices integrated with a heat exchanger, AIChE J., 57 (2011) 1780.

Martinez, L., F.G. Florido-Diaz, Theoretical and experimental studies on desalination using membrane distillation. Desalination, 139 (2001) 373-379.

Phattaranawik, J., Jiraratananon, R., Fane, A.G., Heat transport and membrane distillation coefficients in direct contact membrane distillation, J. Membr. Sci.212(1-2) (2003) 177-193.

Alklaibi, A.M., N. Lior, Heat and mass transfer resistance analysis of membrane distillation, J. Membr. Sci. 282 (2006) 362-369.

Li, B., K.K. Sirkar, Novel membrane and device for direct contact membrane distillation-based desalination process, I&EC Res., 43 (2004) 5300.

Song, L., B. Li, K.K. Sirkar, J.L. Gilron, Direct contact membrane distillation-based desalination: novel membranes, devices, larger-scale studies and a model, I&EC Res., 46 (2007) 2307.

Song, L., Z. Ma, X. Liao, P.B. Kosaraju, J.R. Irish, K.K. Sirkar, Pilot plant studies of novel membranes and devices for direct contact membrane distillation-based desalination, J. Membr. Sci., 323 (2008) 257.

Gilron, J.L., L. Song, K.K. Sirkar, Design for cascade of cross-flow direct contact membrane distillation, I&EC Res., 46 (2007) 2324.

He, F., J. Gilron, H. Lee, L. Song, K.K. Sirkar, Potential for scaling by sparingly soluble salts in cross-flow DCMD, J. Membr. Sci., 311 (2008) 68.

He, F., K. K. Sirkar, J. Gilron, Studies on scaling of membranes in desalination by direct contact membrane distillation: CaCO3 and mixed CaCO3/CaSO4 systems, Chem. Eng. Sci., 64 (2009a) 1844.

He, F., K.K. Sirkar, J. Gilron, Effects of antiscalants to mitigate membrane scaling by direct contact membrane distillation, J. Membr. Sci., 345 (2009b) 53.

Mondal, S., R. Wickramasinghe, Produced water treatment by nanofiltration and reverse osmosis. J. Membr. Sci., 322 (1) (2008) 162-170.

Alkhudhiri, A., N. Darwish, N. Hilal, Produced water treatment: Application of air gap membrane distillation Desalination, 309 (2013) 46-51.

Webb, C., LNSP. Nagghappan, G. Smart, J. Hoblitzell, R. Franks, Desalination of Oilfield-Produced Water at the San Ardo Water Reclamation Facility, CA, SPE 121520-PP, 2009.

Singh, D., P. Prakash, K.K. Sirkar. Deoiled produced water treatment using direct-contact membrane distillation, I&EC Res., 52 (2013) 13439.

Sengupta, A., P.A. Peterson, B.D. Miller, J. Schneider, C.W. Fulk, Jr. Large-scale application of membrane contactors for gas transfer from or to ultrapure water, Separation and Purification Technology, 14, (1998) 189.

Sieder, E. N., C.E. Tate, Heat transfer and pressure drop of liquids in tubes. Ind. Eng. Chem., 28 (1936) 1429-1435.

Sirkar, K.K., L. Song, Pilot-Scale Studies for Direct Contact Membrane Distillation-Based Desalination Process, U.S. Department of the Interior Bureau of Reclamation Desalination and Water Purification Research and Development Program Report No. 134,2009. Online resource: http://www.usbr.gov/research/AMT/reportpdfs/report134.pdf.

Li, L., L. Song, K. K. Sirkar, Desalination performances of large hallow fiber-based DCMD devices, I&EC Res., 56 (2017)1594-1603.

* cited by examiner

HOLLOW FIBER MEMBRANE MODULE FOR DIRECT CONTACT MEMBRANE DISTILLATION-BASED DESALINATION

CROSS-REFERENCE TO RELATED APPLICATIONS

This application is a divisional of U.S. non-provisional application Ser. No. 16/607,015, filed on Oct. 21, 2019 and entitled "Hollow Fiber Membrane Module for Direct Contact Membrane Distillation-Based Desalination," which is a national phase of international application serial number PCT/US2018/028860, filed on Apr. 23, 2018, and entitled "Hollow Fiber Membrane Module for Direct Contact Membrane Distillation-Based Desalination," which itself claims priority to U.S. provisional application Ser. No. 62/488,437, filed on Apr. 21, 2017, and entitled "Hollow Fiber Membrane Module for Direct Contact Membrane Distillation-Based Desalination," the contents of each of which being incorporated herein in their entireties.

STATEMENT REGARDING FEDERALLY SPONSORED RESEARCH

This invention was made with government support under Agreement No. R12AC80907 awarded by the U.S. Bureau of Reclamation. The government has certain rights in the invention.

FIELD OF THE DISCLOSURE

The present disclosure relates to a membrane module for direct contact membrane distillation (DCMD). More particularly, the present disclosure is directed to a DCMD system and method for use in desalination.

BACKGROUND

Membrane distillation could be used for desalination, which is the production of fresh water from saline water. There are many potential advantages of membrane distillation for water production by such desalination techniques. These advantages include:

(a) membrane distillation produces high quality distillate;

(b) water can be distilled at relatively low temperatures (e.g., 30 to 100 degrees C.) and low pressure (e.g., 1 atm);

(c) low grade heat (e.g., solar, industrial waste heat, or desalination waste heat) may be used; and (d) water does not require extensive pretreatment to prevent membrane fouling as in pressure-based membrane processes.

Generally, membrane distillation (MD) is an evaporation process of a volatile solvent or solute species from a solution (in most cases, an aqueous solution), driven by a difference between its partial pressure over the solution contacting one side of a porous hydrophobic membrane and its partial pressure on the other side of the membrane. When the partial pressure difference through the membrane is created by the direct contacting of a liquid cooler than the feed on the other side of the membrane, the process is called direct contact membrane distillation (DCMD). In a hollow fiber-based process, the hot brine flows on the shell side of the fiber and the cold distillate flows on the tube side through the fiber bore.

In a MD process, the membrane is generally porous and hydrophobic. In one variety of MD, direct contact membrane distillation (DCMD), hot brine flows on one side of a gas-filled porous hydrophobic hollow fiber membrane and cold distillate flows on the other side of the membrane. Surface tension forces withhold liquids from the pores and prevent penetration by the liquids. The withholding of the liquids is intended to prevent contact between the two liquids in a DCMD process. Generally, the solutions being processed are aqueous and their surface tensions are higher than the critical surface tension of the polymeric membrane.

In a DCMD process, the temperature difference translates to a corresponding vapor pressure difference across the membrane and provides a driving force for the membrane distillation process. Evaporation occurs at the solution surface if the vapor pressure on the solution side is greater than the vapor pressure at the condensate surface. Vapors then diffuse through the pores to the cooler surface where they condense.

Desalination by membrane distillation (MD) recovers pure water vapor from hot brine by passing the brine on one side of a porous hydrophobic membrane whose pores are gas-filled. Direct contact MD (DCMD), vacuum MD (VMD), sweep gas MD (SGMD) and air gap MD (AGMD) (Sirkar, 1992 [1]; Lawson and Lloyd, 1997 [2]; Drioli et al., 2005 [3]; Khayet, 2008[4]) are four different types of MD depending on the conditions maintained on the other side of the membrane. In DCMD, cold distillate on the other side of the membrane locally condenses water vapor coming through the membrane pores and becomes heated up in the process. This heat is recycled to heat the cooled/spent brine from the DCMD unit in a heat exchanger for further desalination (Lee et al., 2011) [5].

Considerable research has been carried out on the DCMD process. A few publications are listed here: Schofield et al., 1987[6]; Schofield et al., 1990[7]; Martinez and Florido-Diaz, 2001[8]; Phattaranawik et al., 2003[9]; Alklaibi and Lior, 2006[10]; Khayet, 2008[4]. Extensive work has also been carried out to characterize and scale up the DCMD process (Li and Sirkar, 2004[11]; Song et al., 2007[12]; Song et al., 2008[13]) using a novel porous fluorosiloxane-coated porous hydrophobic hollow fiber membrane (HFM) housed in a rectangular cross-flow module as well as develop its cost estimates (Gilron et al., 2007[14]) for desalination. The water fluxes achieved were quite high. The membrane performance was stable (Song et al., 2008) [13]. This last reference describes highly encouraging results from pilot plant studies for seawater desalination at a water production rate of around 2.34 L/min (0.62 gpm) using larger membrane modules; the salt concentration achieved after continuous desalination for a few days using batch recirculation was around 19%.

Extensive lab-scale studies with brines having highly supersaturated solutions of $CaSO_4$ and/or $CaCO_3$ have demonstrated excellent scaling resistance (He et al., 2008[15]; He et al., 2009a [16]; He et al., 2009b [17]) in these porous fluorosiloxane-coated polypropylene hollow fiber-based rectangular cross-flow DCMD modules and a countercurrent cascade of modules (Lee et al., 2011[5]). Brines having anti-scalants, e.g., reverse osmosis (RO) concentrates, did not lead to membrane wetting (He et al., 2009b) [17]).

The economics of desalination by a countercurrent cascade of cross flow membrane distillation modules are strongly influenced by cascade design and energy cost. For an energy-efficient process with a countercurrent cascade of such cross-flow modules, the temperature difference between the hot and cold streams in the countercurrent arrangement is low; the larger the number of cross-flow stages, the lower the temperature difference. Using a countercurrent cascade, Lee et al. (2011) [5] have experimentally obtained a stage thermal efficiency value approaching 90%. This reduction in conductive heat loss has in effect eliminated one important shortcoming of the DCMD vis-à-vis VMD.

With low-cost steam, the technology appears to be near-competitive with reverse osmosis (Gilron et al., 2007[14]). Further, it can be used to concentrate brine to around 20% salt (Song et al., 2008[13]) and thereby reduce the brine disposal cost in inland desalination. If waste heat or solar heat sources are available, then the economics are even better. Produced water is an important energy source (Mondal and Wickramasinghe, 2008[18]; Alkhudhiri et al., 2013 [19]; Webb et al., 2009[20]). Such hot produced waters are de-oiled first by induced gas/dissolved air flotation and walnut shell treatment. The de-oiled produced water, currently treated by as many as eight steps (in the OPUS™ Process) including substantial cooling, is treated by RO at the end (see Webb et al. (2009) [20] for a detailed process configuration). Using de-oiled produced water (from Chevron Corp.), recent studies (Singh et al., 2013) [21] using small lab-scale modules achieved as much as 80% water recovery in one step via simple DCMD in batch recirculation mode; no cooling of the produced water was needed. Scaling problems were nonexistent. However, the current rectangular hollow fiber module design could create a bottle-neck for scaling up.

The rectangular membrane module structure has been described in Li and Sirkar (2004) [11], Song et al. (2007) [12] and Song et al. (2008) [13]. For example, in FIG. 3 of Li and Sirkar (2004) [11], part c shows an assembled module incorporating a picture frame containing the hollow fiber membranes in the middle. On each side of this picture frame, there are two separate plastic pieces: the face box and the face plate. This design allowed hot brine to enter almost uniformly across the cross section of the picture frame of HFMs even though it is delivered via a central tube (Song et al., 2008)[13].

This module design included five rectangular plastic-based flat components—one picture frame containing the hollow fiber membranes, two face boxes and two face plates. To prevent hot brine leakage, there are rectangular gaskets on each side of the membrane-containing picture frame. Leakage is prevented by having many bolts tightening the whole assembly together. In the case of two such picture frames placed back to back, the number of face boxes and face plates per picture frame can be reduced to one each.

When such an assembly of two DCMD modules back-to-back (called a single-pair unit configuration) was used in the pilot plant studies (Song et al., 2008) [13], a single module had ~0.67 $m^2$ membrane surface area (based on fiber ID). The total membrane surface area with two such modules back-to-back in the assembly was ~1.34 $m^2$. The overall assembly dimensions containing two back-to-back modules were 43 cm×16.5 cm×17.5 cm occupying a volume of 12410 $cm^3$. In this configuration, the membrane surface area per unit equipment volume based on the fiber OD (630 μm) instead of the fiber ID (330 μm) is 394 $m^2/m^3$.

Leak-free operation of an assembly of such modules is demanding. The wasted volume in a module is high. Inside each picture frame, half of the volume is wasted since the hollow fibers cannot be potted over the whole thickness of the picture frame. Scale up to larger dimensions is problematic. In effect, a very large number of such small units need to be assembled for scale up. Even though it is a hollow fiber-based unit, the effective membrane surface packing density is quite low, resulting in a large footprint and weight in larger-scale plants. Further, the cost naturally goes up in a plate and frame configuration due to so many flat plates having well-machined surfaces to provide leak-proof operation, appropriate flow distribution, etc.

SUMMARY

In accordance with embodiments of the present disclosure, exemplary embodiments are generally directed to a cylindrical cross-flow hollow fiber-based module.

A cylindrical cross-flow hollow fiber-based module configuration can lead to potentially much smoother scale up. A DCMD process is disclosed for recovering water vapor from brine using a novel cross-flow hollow fiber membrane module in a cylindrical geometry over the temperature range of approximately 40 to 95° C. This temperature range is only exemplary. It will be understood that other temperature ranges could be employed. Pressure can also be higher than atmospheric. The porous fluorosiloxane-coated PP hollow fiber membranes in the module were similar to those employed in earlier studies. The PP hollow fibers may be replaced by those of polyvinylidene fluoride (PVDF), and other hydrophobic polymers such as polytetrafluoroethylene (PTFE), poly(4-methyl-1-pentene (PMP), etc.

Thermally driven membrane distillation-based desalination is becoming attractive especially for concentrated saline waters having scaling salts. Although a rectangular module with crossflow of hot brine over hydrophobic porous hollow fibers of PP having a porous fluorosiloxane coating demonstrated extraordinary DCMD performance and resistance to fouling by scaling precipitates, it had a low surface area per unit volume and posed scale-up problems. A cylindrical hollow fiber device has been developed having a surface area per unit volume of 1526 $m^2/m^3$ which is about four times that of the rectangular modules developed earlier. This surface area per unit volume is only exemplary. It will be understood that other surface areas per unit volume could be used. It can be scaled up very easily to larger diameters to accommodate large values of membrane surface area.

The module has been operated with the hot brine coming into the shell side through a central feed tube either from one end (dead-end configuration) or from both ends (split-flow configuration) and going radially out. The results of numerical simulations of a model developed for the dead-end configuration provides a reasonable description of the observed water vapor flux variation with hot brine inlet temperature when the module is operated in the dead-end operational mode. The split-flow configuration could provide a slightly higher flux. In one embodiment, the hollow fiber length of 45.7 cm in the largest module is almost twice that of the length of the largest rectangular module studied earlier. Simulations of the model show that the membrane water vapor flux performance is in line with what was observed with the largest rectangular modules studied earlier in a pilot plant. One can increase the length of the hollow fibers to a few times that of 45.7 cm length. Further, the internal diameter of the hollow fiber may be increased appropriately to reduce the distillate side pressure drop.

Any combination and/or permutation of the embodiments are envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in using the disclosed systems and methods, reference is made to the accompanying Figures, wherein.

DETAILED DESCRIPTION OF EXEMPLARY EMBODIMENTS

Figure 1:
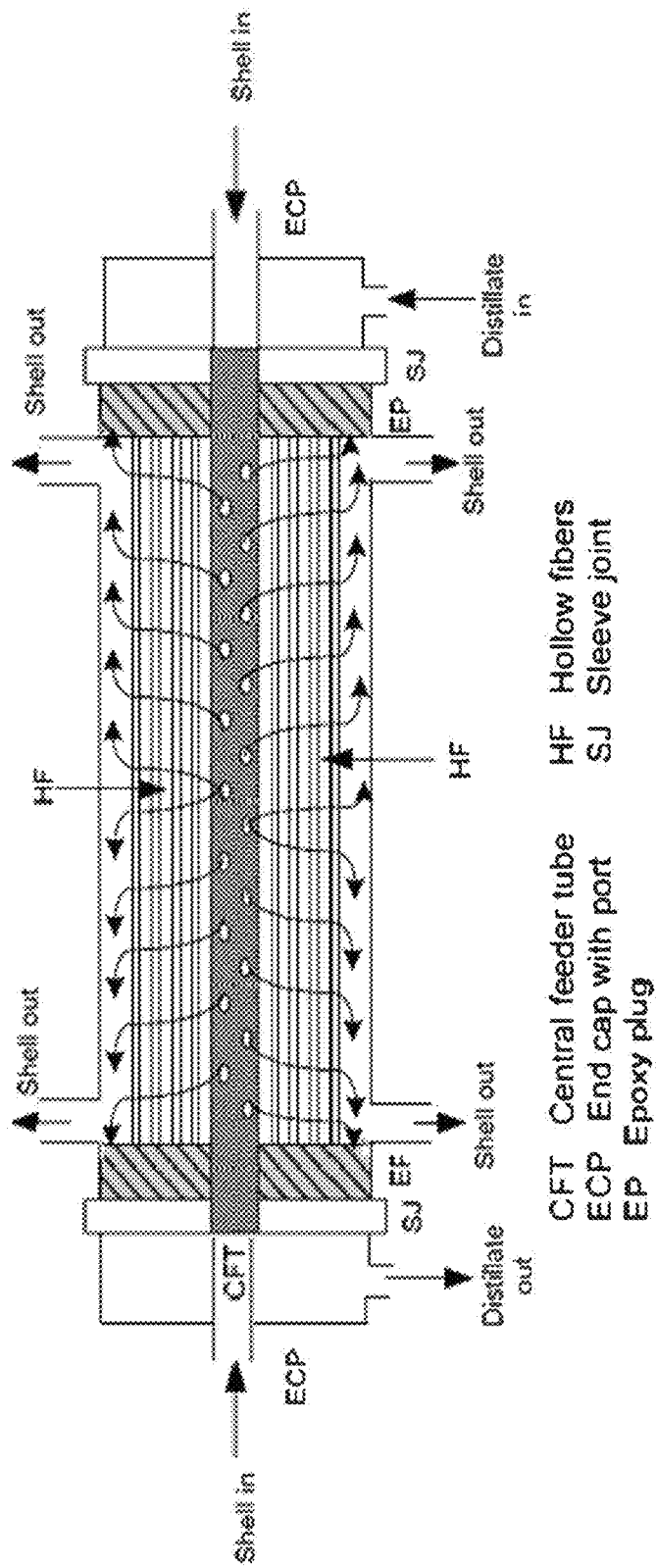
FIG. 1 is a schematic view of cross-flow module with flow directions at the shell side and feed brine entering the central feeder tube from both sides.
Figure 2:
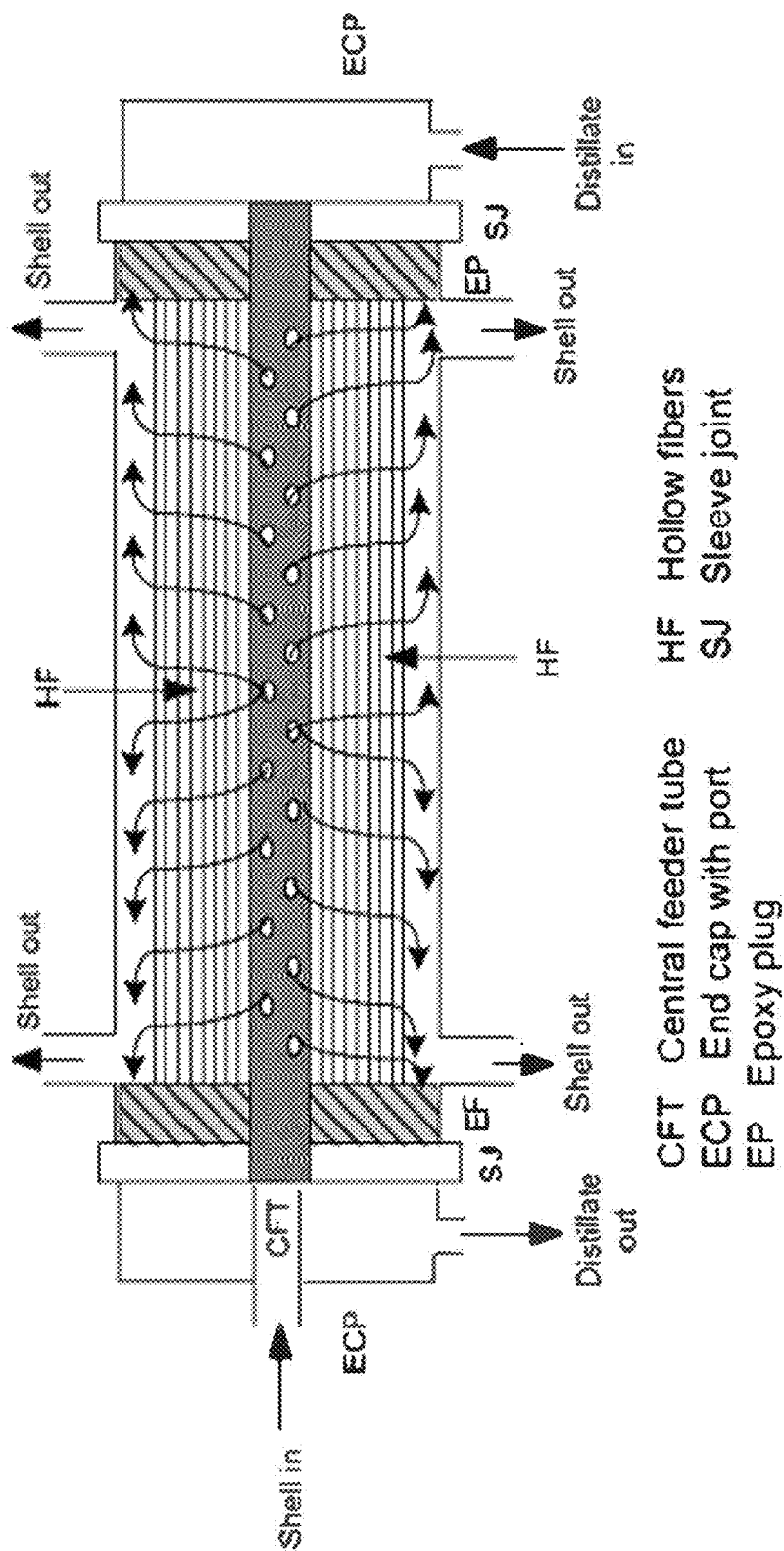
FIG. 2 is a schematic view of cross-flow module with flow directions at the shell side and feed brine entering the central feeder tube from one side only.

In accordance with embodiments of the present disclosure, exemplary embodiments are generally directed to a cylindrical cross-flow hollow fiber-based module.
Membrane Modules A basic design of the cylindrical cross-flow membrane module was based on an understanding of water vapor transfer rates under particular cross-flow conditions in the larger diameter coated hollow fibers used in previous studies. The hot brine is in a radially outward flow configuration through the hollow fiber bed from a central inlet feeder tube. The basic module design is schematically shown in FIG. 1 and FIG. 2. Example modules were produced with membrane surface areas of about 0.15 m² and 0.6 m². It will be understood that other membrane surface areas could be used.

The brine may be introduced into such a module from both ends of the central feeder tube as shown in FIG. 1 (Split-Flow Mode). In such a case, the diameters of the holes on the wall of the central feeder tube (CFT) increase from both ends toward the middle where the increase in the diameter of the hole stops. On the other hand, if the brine is introduced from one end only as in FIG. 2 (Dead-End Mode), the diameters of the holes could continue to increase from the brine inlet to the other end.

Figure 3:
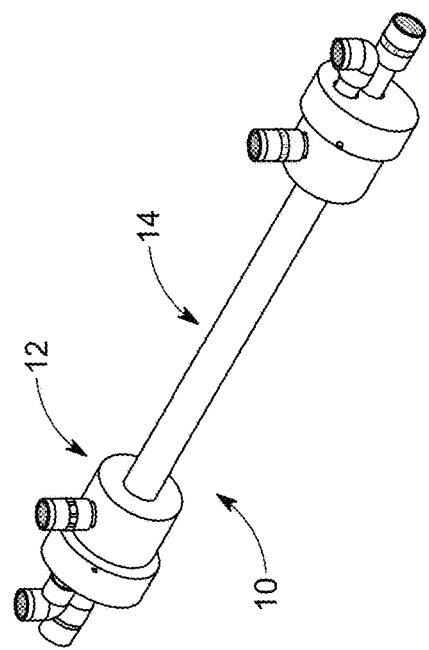
FIG. 3 is a perspective view of an embodiment of a module.
Figure 4A:
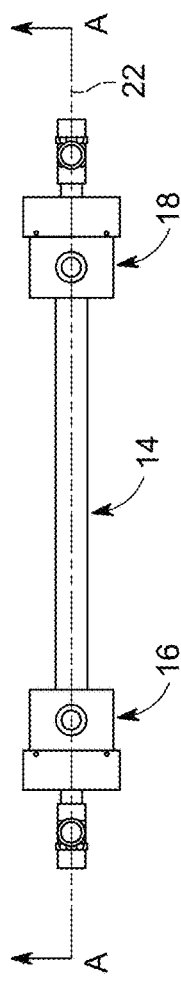
FIG. 4A is a top plan view of the module of FIG. 3.
Figure 4B:
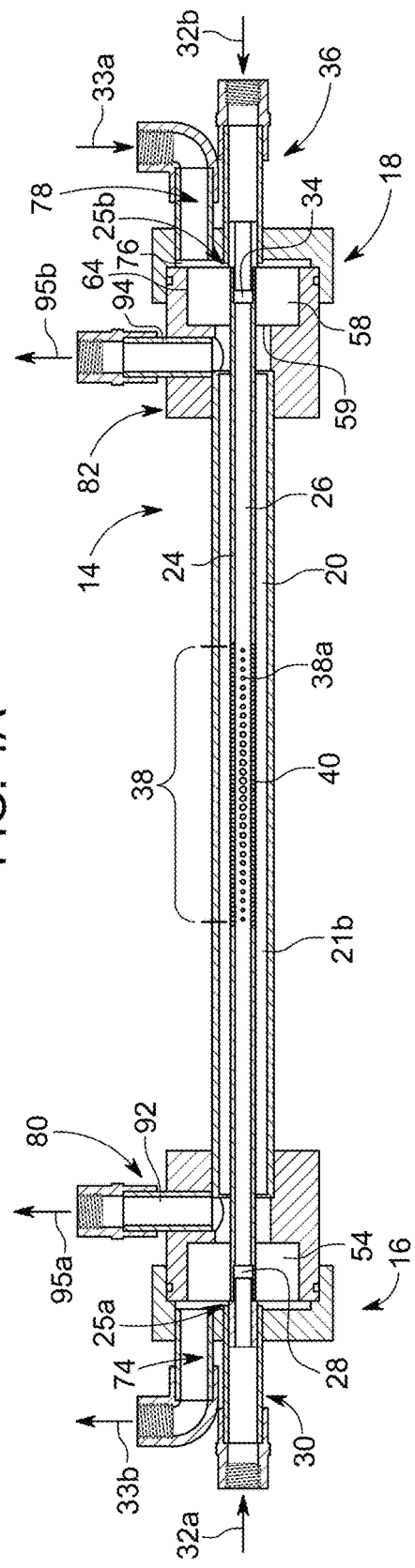
FIG. 4B is a cross-sectional view of the module of FIG. 4A taken along cut line A-A.

FIG. 3 illustrates an example membrane distillation module 10 in accordance with the present invention. With reference to FIGS. 3-5B, Module 10 includes a housing 12 with a substantially cylindrical wall 14 and first and second ends 16, 18 together defining a chamber 20 with an axis 22 passing through first and second ends 16, 18. A delivery conduit 24, otherwise referred to herein as a "central inlet feeder tube", extends into chamber 20. In some embodiments, delivery conduit 24 extends through chamber 20 either along or substantially parallel to axis 22. Delivery conduit 24 includes a lumen 26 for conveying fluid into chamber 20. An inlet 28 opens to lumen 26 of delivery conduit 24. In the illustrated embodiment, inlet 28 may be fluidically coupled to a first fluid intake pipe 30 for receiving intake fluid flow 32. In some embodiments, intake fluid flow 32 is the feed flow, which, in the case of DCMD of brine, is heated brine feed flow.

In some embodiments, delivery conduit 24 may extend axially through chamber 20 to define first and second axially opposed ends 25a, 25b of delivery conduit 24. Second end 25b of delivery conduit 24 may include a second inlet 34 opening to lumen 26 of delivery conduit 24, and adjacent to second end 25b of delivery conduit 24. First inlet 28 may be adjacent to first end 25a of delivery conduit 24, such that each of the first and second inlets 28, 34 to lumen 26 are external to chamber 20. Such an arrangement provides for "spilt-flow of the intake fluid flow, wherein a second fluid intake pipe 36 is fluidically coupled to second inlet 34 to convey intake fluid flow 32b to inlet 34 into lumen 26 of delivery conduit 24. In other embodiments, such as that illustrated in FIG. 1, delivery conduit 24 may include a closed end axially opposite from first end 25a delivery conduit 24 to provide the "dead end flow" described herein and in reference to the schematic illustration of FIG. 2. Delivery conduit 24 includes an outlet 38 opening to lumen 26 of delivery conduit 24, and positioned in chamber 20. Outlet 38 permits fluid flow, such as the hot brine flow, out from lumen 26 into chamber 20. Outlet 38 may be formed in a variety of configurations and mechanisms. In some embodiments, outlet 38 may include one or more apertures 38a. An aspect of the present invention is the provision of outlet 38 with a variable fluid flow-through restriction in order to more evenly distribute outlet fluid flow from lumen 26 throughout a length of chamber 20. Without a variable fluid flow-through restriction, pressure drop of the fluid flow through lumen 26 would result in unequal fluid outflow rates and poor axial outflow distribution. To counteract such effects from pressure drop through lumen 26, delivery conduit 24 may be provided with an outlet 38 that places less fluid flow-through restriction at locations where reduced fluid pressure regimes in lumen 26 are likely to exist, such as with increased distance from the one or more inlets to lumen 26. Consequently, outlet 38 may have decreasing fluid flow-through resistance with increasing axial distance from the fluid flow inlet to lumen 26. In the case of the dead end flow regime schematically illustrated in FIG. 1, outlet 38 may provide a range of decreasing fluid flow-through resistance with increasing axial distance along lumen 26 from the single fluid flow inlet to lumen 26. In the embodiment illustrated in FIG. 4B, by contrast, for a split-flow regime utilizing first and second fluid inlets 28, 34, fluid flow-through resistance for outlet 38 may decrease with increasing distance from both of inlets 28, 34, such as toward a midpoint 40 of delivery tube 24. For the purposes hereof, the midpoint 40 of delivery tube 24 may be the location at which intake fluid pressure drop from each of the first and second inlets 28, 34 is equivalent. In some embodiments, such midpoint 40 may be equidistant from certain structures of module 10. In the illustrated embodiment, outlet 38 includes a plurality of apertures increasing in size toward midpoint 40 of delivery tube 24. Apertures 38a may assume a variety of configurations to accomplish the variable fluid flow-through restriction described above. It is contemplated that other approaches for creating a variable fluid flow-through restriction for outlet 38 may be employed, such as density of apertures, valved apertures, and so on.

Module 12 includes a membrane 50 formed by a plurality of hollow fibers 52 in chamber 20. For the DCMD of brine, applicant has found that such hollow fibers 52 are preferably porous and hydrophobic, as described in greater detail herein. The respective lumens of such hollow fibers 52 form a tube side 21a of chamber 20. A chamber volume external to delivery conduit 24 and hollow fibers 52 in chamber 20 forms a shell side 21b of chamber 20.

Hollow fibers 52 may be bundled or unbundled and aligned substantially axially in chamber 20. Hollow fibers 52 may substantially circumaxially surround delivery conduit 24, or may be arranged in other patterns suitable for the intended DCMD application. In one aspect of the invention, hollow fibers 52 may be somewhat loosely packed in chamber 20, with a packing fraction of less than about 0.5, more preferably less than about 0.3, and still more preferably less than about 0.25. In some embodiments, the packing fraction of hollow fibers 52 in chamber 20 is between about 0.03 and about 0.25. The relatively loose packing fraction of hollow fibers 52 in chamber 20 permits radial cross-flow of brine from delivery conduit 24 over and between individual fibers to maximize available contact surface area of the hollow fiber outer surface to the brine. The surface area of the plurality of hollow fibers 52 per unit volume in chamber 20 may be at least about 400 $m^2/m^3$.

The relatively loose packing fraction of hollow fibers 52 in chamber 20 may also benefit module 10 in reducing a tendency for precipitate buildup in and around the fiber bundle. DCMD of brine inevitably results in some minerals and salts precipitating from the brine. The solid precipitate can collect on surfaces in chamber 20, particularly where low shell side flow is available to sweep the minerals out from the chamber 20. An example low flow area is within the hollow fiber bundle, external to the fibers. Precipitates can deposit on the outer surface of the fibers and form barriers to hot brine flow. The reduced brine flow in that area can lead to further precipitate deposition. This cycle of precipitate buildup may be diminished with the presently contemplated low fiber packing fraction, wherein sufficient void space permits movement of the fibers within the bundle. Precipitates are therefore more likely to be swept out of chamber 20 with the hot brine, instead of depositing on the outer surface of the fibers. A particular concern with precipitate buildup is with salts having relatively sharp crystalline structures that can damage the hollow fibers. It is therefore beneficial to provide a module construct that promotes removal of precipitates during operation.

Figure 5A:
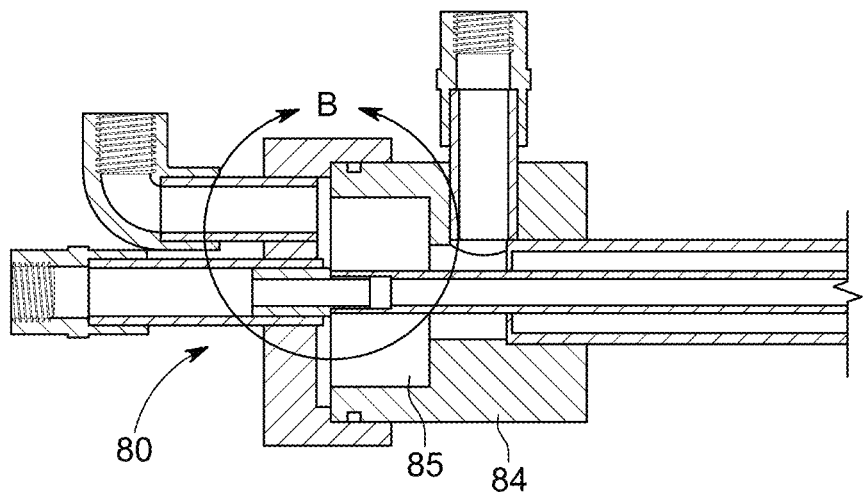
FIG. 5A is a cross-sectional view of an embodiment of a module.
Figure 5B:
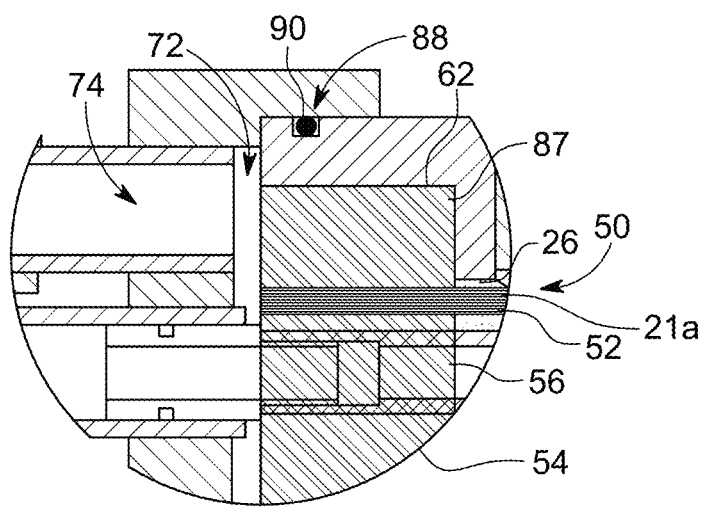
FIG. 5B is an enlarged view of the portion of the module of FIG. 5A denoted by "B".

Hollow fibers 52 may be secured in chamber 20 by epoxy potting. As illustrated in FIG. 5B, first ends of hollow fibers 52 are secured in a first potting 54, which seals against an end cap assembly surface 62 to form a first sealed end 56 to shell side 21b of chamber 20. Hollow fibers 52 are preferably secured by and in first potting 54 to extend at least partially therethrough, so that the respective lumens forming tube side 21a of chamber 20 are open to a first plenum 72 established between first potting 54 and a first tube side port 74 in housing 12. By access to the lumens of hollow fibers 52, therefore, first plenum 72 is in fluid communication with tube side 21a of chamber 20 through first potting 54.

A similar arrangement may be provided at axially opposite second ends of hollow fibers 54, wherein the second ends of hollow fibers 52 are secured in a second potting 58, which seals against an end cap assembly surface 64 to form a second sealed end 59 to shell side 21b of chamber 20. The lumens forming tube side 21a of chamber 20 are preferably open to a second plenum 76 established between second potting 58 and a second tube side port 78 in housing 12. By access to the lumens of hollow fibers 52, therefore, second plenum 76 is in fluid communication with tube side 21a of chamber 20 through second potting 58.

In preferred embodiments, cold distillate may be fed into tube side 21a of chamber 20 through one of first and second tube side ports 74, 78. For example, cold distillate may be fed through second tube side port 78 as distillate inlet flow 33a, into second plenum 76, and further into the respective hollow fiber lumens forming tube side 21a of chamber 20. The cold distillate is conveyed within the hollow fiber lumens through second potting 58 into chamber 20. The DCMD process permits collection of condensed water vapor passing through membrane 50 into tube side 21b. Continued flow of the cold distillate (and collected condensed water vapor) is then conveyed through first potting 54 into first plenum 72, and ultimately out from module 10 through first tube side port 74 as distillate outlet flow 33b.

Hot brine, as described above, may be fed through one or more of first and second fluid intake pipes 30, 36, which are fluidically coupled to respective first and second inlets 28, 34 to lumen 26 of delivery conduit 24. The hot brine may be conveyed in lumen 26 to outlet 38, wherein the hot brine flows radially out from delivery conduit 24 into shell side 21b of chamber 20 for cross flow contact with the hollow fibers 52. Flow of the concentrated hot brine exits from shell side 21b of chamber 20 through one or more shell side ports 92, 94 in housing 12 as shell outlet flow 95a, 95b.

It should be understood that "brine" is an example feed fluid for treatment by the membrane distillation module of the present invention. The term "brine" is intended to mean salinated water. Other feed fluids, however, are contemplated as being useful in the present invention. Moreover, the term "distillate" is meant to include any fluid or environment useful in driving distillation transport of vapor across membrane 50. Another pertinent term for such fluid may be "condensing fluid".

Preferably, shell side ports 92, 94 are disposed between first and second sealed ends 56, 59 of chamber 20. Moreover, shell side ports 92, 94 may be positioned distal from outlet 38 to ensure sufficient brine residence time in chamber 20 and contact between the hot brine in shell side 21b and hollow fibers 52 carrying cold distillate in tube side 21a. By positioning shell side ports 92, 94 between first and second sealed ends 56, 59 of chamber 20, shell side fluid need not be passed through at least one of first and second pottings 54, 58. In many past designs, shell side fluid was routed through narrow and even tortuous passageways in the epoxy potting. Precipitates from the shell side fluid could accumulate in passageways, leading to restricted flow and even blockages.

The illustrated embodiment of module 10 includes first and second end cap assemblies 80, 82 at respective ends 16, 18 of housing 12. Each end cap assembly, in the illustrated embodiment, includes a connection collar 84 secured to cylindrical wall 14, and an end cap 86 secured to connection collar 84. A gasket 88 may be disposed in a gasket groove 90 to establish a seal between end cap 86 and collar 84. However, it is contemplated that end cap 86 may be removably secured to connection collar 84 for ease of service to module 10.

Connection collar 84 includes an annular recess 85 that forms a location for securely receiving a respective one of first and second pottings 54, 58. In particular, annular recess 85 forms a shoulder 87 against which the potting may be molded. After placement at annular recess 85, the potting forms a clean transition with the remainder of the bounding surface of chamber 20, with minimal ledges or pockets in which precipitates could gather and accumulate. By positioning shell side ports 92, 94 between first and second sealed ends 56, 59 of chamber 20 in the present arrangement, precipitates are likely to be swept out from chamber 20 through shell side ports 92, 94 without having an opportunity to accumulate at low flow areas of the module.

A system of a plurality of modules may be constructed in series so that the hot brine passes directly from a first distillation chamber to a second distillation chamber, with the shell side outlet of a first module being fluidically coupled to a delivery conduit in a second module. A number of modules may therefore be placed in series to increase total concentration of the brine, and recovery of water vapor from the original feed stream.

In one embodiment, the hollow fibers are porous hydrophobic polypropylene (PP) of internal diameter (ID) 330 µm, wall thickness 150 µm having a pore size of ~0.6 µm and a porosity of 0.6+(Membrana, Charlotte, NC). On the outside surface of these hollow fibers there is a light plasma-polymerized fluorosiloxane coating having pores somewhat larger than those of the PP substrate. Porous hydrophobic hollow fibers of any suitable material may also be used with appropriate plasma-polymerized fluorosiloxane coating on the outside surface. These hollow fibers may have other dimensions of their IDs and wall thicknesses as well.

Initially a few small modules (#1, #2, #3) were fabricated using porous hydrophobic polyvinylidene fluoride (PVDF) hollow fibers (Arkema Inc., King of Prussia, PA) as a substrate instead of the coated PP hollow fibers. The performance of these modules guided the development of the design for larger modules. All PVDF hollow fiber-based modules were tested in a low temperature DCMD set up (Li and Sirkar, 2004 [11]) and subsequently, the changes needed were made to improve the DCMD performance.

The fiber length in both types of larger modules was 45.7 cm. It will be understood that the length of the fibers may vary. The module having lower membrane surface area included fewer layers of hollow fibers wrapped around a central hot brine inlet tube having holes drilled on their surface for introducing the hot brine feed into the shell side around the hollow fibers. The hole diameters may increase with distance from the tube inlet(s). The module having a larger membrane surface area has a deeper layer of hollow fibers in the radial brine flow direction to achieve ~4 times higher membrane surface area. Details of these hollow fiber membrane modules are provided in Table 1.

TABLE 1

Details of different membrane modules and hollow fibers

| Particulars | Small module #1 | Small module #2 | Small module #3 | Large module I | Large module II | Large module III | Large Module IV |
|---|---|---|---|---|---|---|---|
| Membrane type | PVDF | PVDF | PVDF | Coated PP* | Coated PP* | Coated PP* | PVDF |
| Fiber ID (µm) | 692 | 692 | 692 | 330 | 330 | 330 | 692 |
| Fiber OD (µm) | 925 | 925 | 925 | 630 | 630 | 630 | 925 |
| No. of fibers | 15 | 15 | 15 | 316 | 316 | 1266 | 600 |
| Effective fiber length (cm) | 15.5 | 15.5 | 15.5 | 45.7 | 45.7 | 45.7 | 45.7 |
| Effective membrane surface area (cm$^2$)** | 50.4 | 50.4 | 50.4 | 1500 | 1500 | 6000 | 5950 |
| Fiber packing fraction | N/A | 0.03 | 0.03 | 0.13 | 0.13 | 0.24 | 0.25 |
| Fiber surface area per unit volume (m$^2$/m$^3$)*** | N/A | N/A | N/A | 1120 | 1120 | 1526 | 1526 |
| CFT ID (cm)**** | 0.5 | 0.5 | 0.5 | 1.3 | 1.3 | 2.5 | 2.5 |
| Module ID (cm) | N/A | 2.0 | 2.0 | 2.8 | 2.8 | 5.2 | 5.2 |
| Module length (cm) | 15.5 | 15.5 | 15.5 | 45.7 | 45.7 | 45.7 | 45.7 |

*Fluorosiloxane coated;
**Based on fiber inner diameter;
***Based on fiber outer diameter;
****CFT—Central Feeder Tube The shell of the tested DCMD modules was fabricated from standard size schedule 40 PVC pipe. The end caps for both of the larger size modules were essentially identical. Standard PVC fittings selected were PVC cemented to the inlet and outlet pipes. The goal was to make a sturdy, light, and inexpensive module that is easy to handle and has much more membrane surface area per unit volume. Further, the module should be capable of being connected easily to other modules. It should be noted that there are no bolts to secure the end caps to the body.

Other design considerations include essentially no shoulder at the shell-side brine outlet locations at every shell-side outlet. Such shoulders are locations where precipitates of scaling minerals could accumulate leading to a buildup which could even extend to the outermost layers of the hollow fibers. These sections of hollow fibers are unlikely to be subjected to the beneficial effects of crossflow and could therefore be potentially vulnerable to wetting-induced brine leakage (see the results shown in FIG. 10 of He et al. (2009a) [16]).

Some design items required experimental verification of their utility. One such item is the shell-side pressure drop as brine flows radially outward from the central tube. It depends on the number of holes and the size of the holes on the periphery of the central tube among others. That is why smaller radial cross-flow modules were fabricated and tested for their DCMD performance. Additional design items involve the packing density of fibers, their possibility of oscillation at higher radial flow velocities and the gap at the outer periphery between the fiber bundle and the shell ID. In one embodiment, the module design allowed membrane surface area packing density upwards of 1,500 $m^2/m^3$.

Considerations on Membrane Module Design
Smaller Membrane Modules

In each of the three small membrane modules #1, #2 and #3, the section having perforated length at the center of the central tube of diameter 0.5 cm was 15 cm long. The central tube of these modules was made with perfluoroalkoxyethylene (PFA) tubing. In module #1, holes of only one size were introduced. In modules #2 and #3, two different hole sizes were created with larger holes in the middle part of the perforated length and the smaller holes on each side of the larger hole region. The hole sizes in module #3 were larger than those in module #2 whose hole sizes were larger than those of module #1. The goal was to study how to reduce shell-side brine pressure drop. The number of PVDF hollow fibers in each module was 15, providing an ID-based effective surface area of 50.47 $cm^2$ and an effective length of 15.6 cm. The hollow fiber dimensions and other information are provided in Table 1. Each module was designed so that hot feed solution could enter from both ends of the module (split-flow).

Larger Membrane Modules

The two larger membrane modules I and II were essentially identical. In larger modules I and II, the section having perforated length at the center of the 1.27 cm diameter central tube was 45.7 cm long. The largest module III with 4 times larger membrane surface area than that of the larger modules I and II was fabricated using standard size schedule 40 PVC pipe and had a 2.54 cm OD perforated central tube in a 5.23 cm diameter PVC pipe acting as shell. This module contained 1266 fluorosiloxane coated porous PP hollow fibers with an effective length of 45.7 cm (18 in) and effective ID-based membrane surface area of 0.6 $m^2$.

Experimental Details for DCMD Studies

Figure 6:
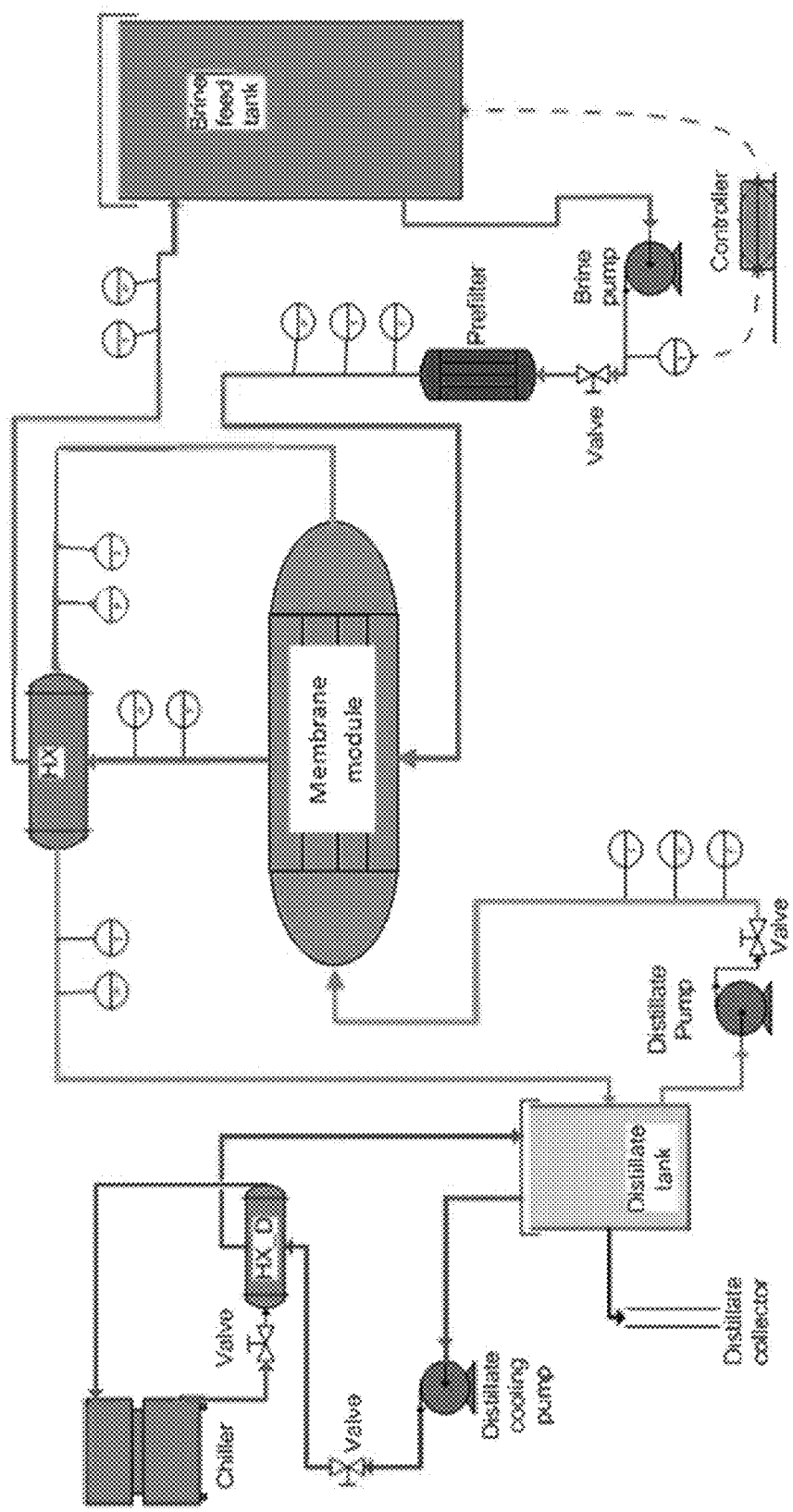
FIG. 6 is a schematic diagram of an experimental setup for DCMD with a heat exchanger (HX) and a membrane module.

Two experimental setups were used for finding out the DCMD performances of various modules. The smaller experimental setup shown in FIG. 6 was employed and described in Lee et al. (2011) [5]. The only difference is that only one cylindrical membrane module was used and not a countercurrent cascade of four small rectangular cross flow modules. The larger experimental setup has been described in detail in Song et al. (2007) [12]. The water vapor flux is defined as $$\text{Water vapor flux} \left( \frac{kg}{m^2 - hr} \right) = \frac{\text{Water vapor collected (kg)}}{\text{Membrane area based on ID } (m^2) \times \text{time (hr)}} \quad (1)$$

The conductivity on the distillate side was measured using a conductivity meter (Orion 115 Aþ, ThermoElectron, Waltham, MA). All experiments were performed with hot brine of 1 wt % NaCl. A few experiments were performed with a small module using a simulated produced water (synthetic water simulating the composition of the Post WEMCO stream (total dissolved solids, 7622 mg/L) (Singh et al. [21])).

Results and Discussion
DCMD Performances of Small Membrane Modules

Figure 7:
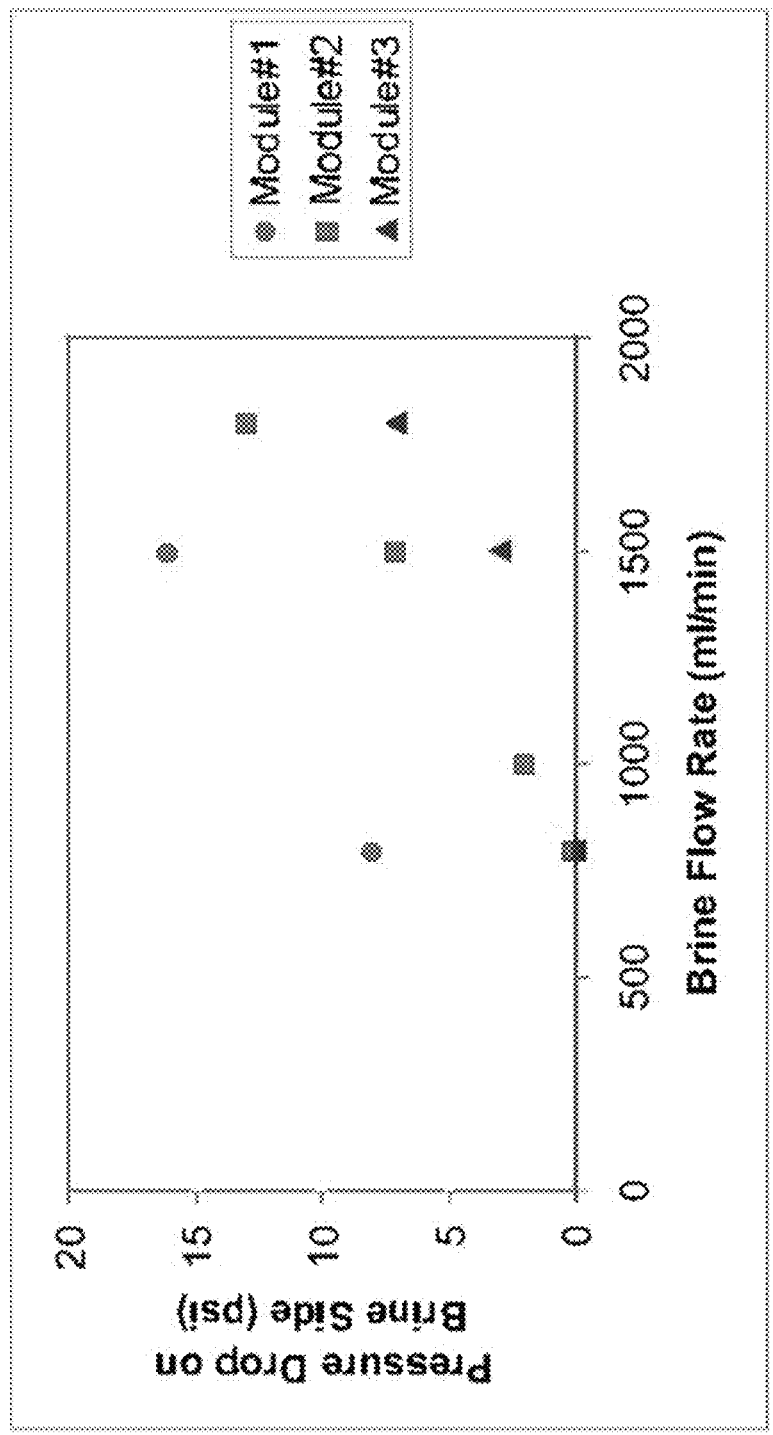
FIG. 7 is a chart showing change in pressure drop encountered by shell side brine for different brine flow rates for small modules #1, #2 and #3.

Experiments were performed with feed brine entering from one end or both ends of the module keeping it in horizontal as well as in vertical position. In all experiments, hot brine was passed through the central tube for radial emission across the porous hollow fibers having cold DI water flowing through them. Due to the very small size of holes in the central feed tube, pressure drop encountered by the shell-side brine was significant. In module #1, the pressure drop increased from 55.12 kPa (8 psi) to 110.2 kPa (16 psi) as the flow rate was increased from 0.8 L/min to 1.5 L/min. Due to the modification in the central tube design, pressure drop encountered by the shell-side brine in module #3 was much lower compared to those in small module #1 and small module #2; it went up from around 0 kPa to 41.34 kPa (6 psi) as the brine flow rate was increased from 0.8 L/min to 1.8 L/min. These results are shown in FIG. 7. Since high pressure drop is not desirable for an energy-efficient process, further changes were introduced in the design of the larger modules including a larger diameter of the central tube itself.

Figure 8:
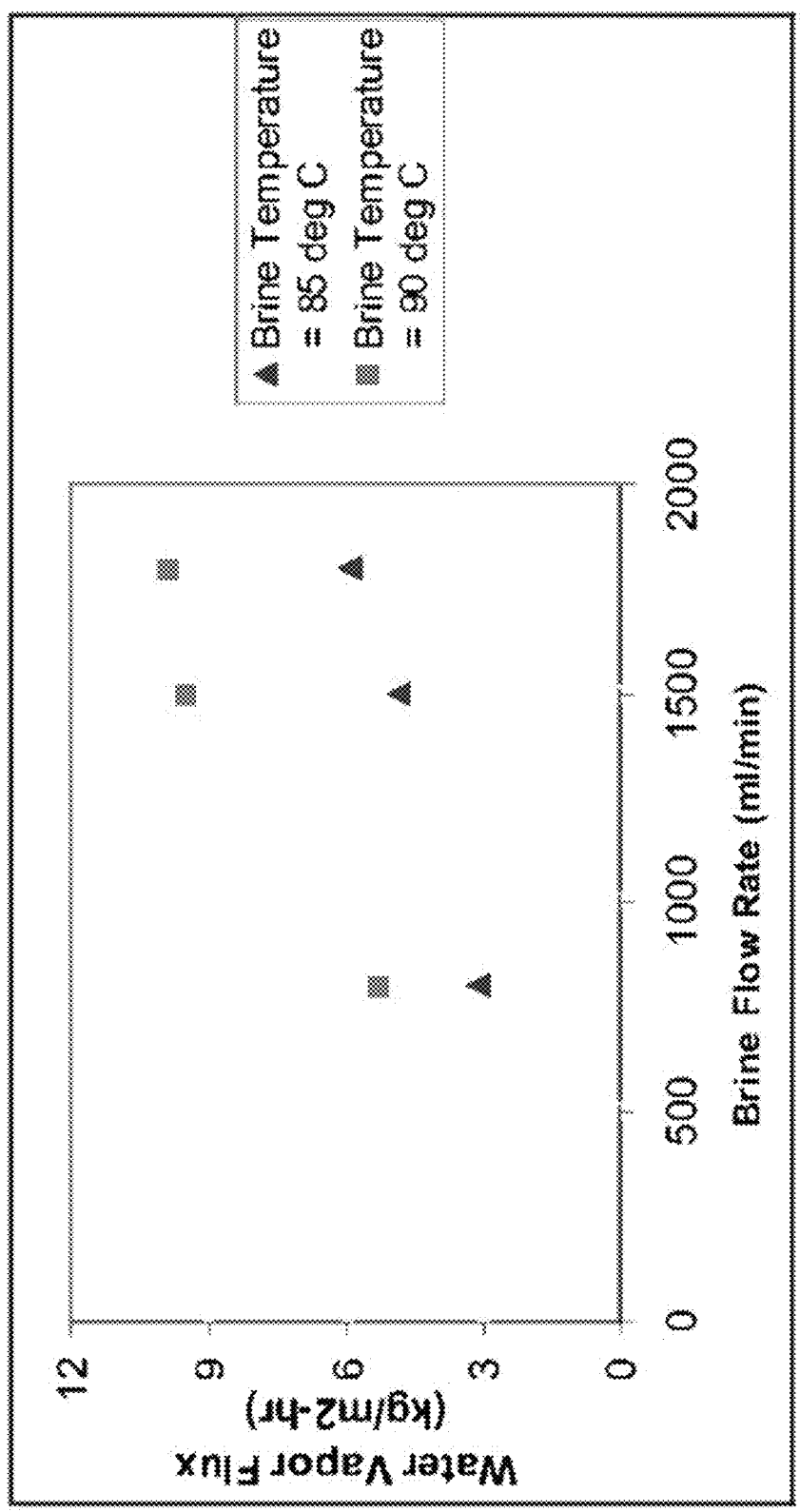
FIG. 8 is a chart showing change in water vapor flux with different brine flow rates for 1% NaCl solution at different temperatures in small module #3.

The DCMD performance of the small module #3 was studied for different brine temperatures and different brine flow rates with 1% NaCl feed solution. As shown in FIG. 8, it was found that water vapor flux was as high as 9.9 $kg/m^2$-hr for brine feed at 90° C. and 1.8 L/min. Water vapor flux increased from 3.1 $kg/m^2$-hr to 5.9 $kg/m^2$-hr as the brine flow rate was increased from 0.8 L/min to 1.8 L/min for the brine feed at 85° C. Similarly, for a brine temperature of 90° C., water vapor flux increased from 5.3 $kg/m^2$-hr to 9.9 $kg/m^2$-hr as the brine flow rate was increased from 0.8 L/min to 1.8 L/min. The conductivity on the distillate side was constant for all experiments indicating that there was no salt leakage from the brine side to the distillate side through the membrane.

Figure 9:
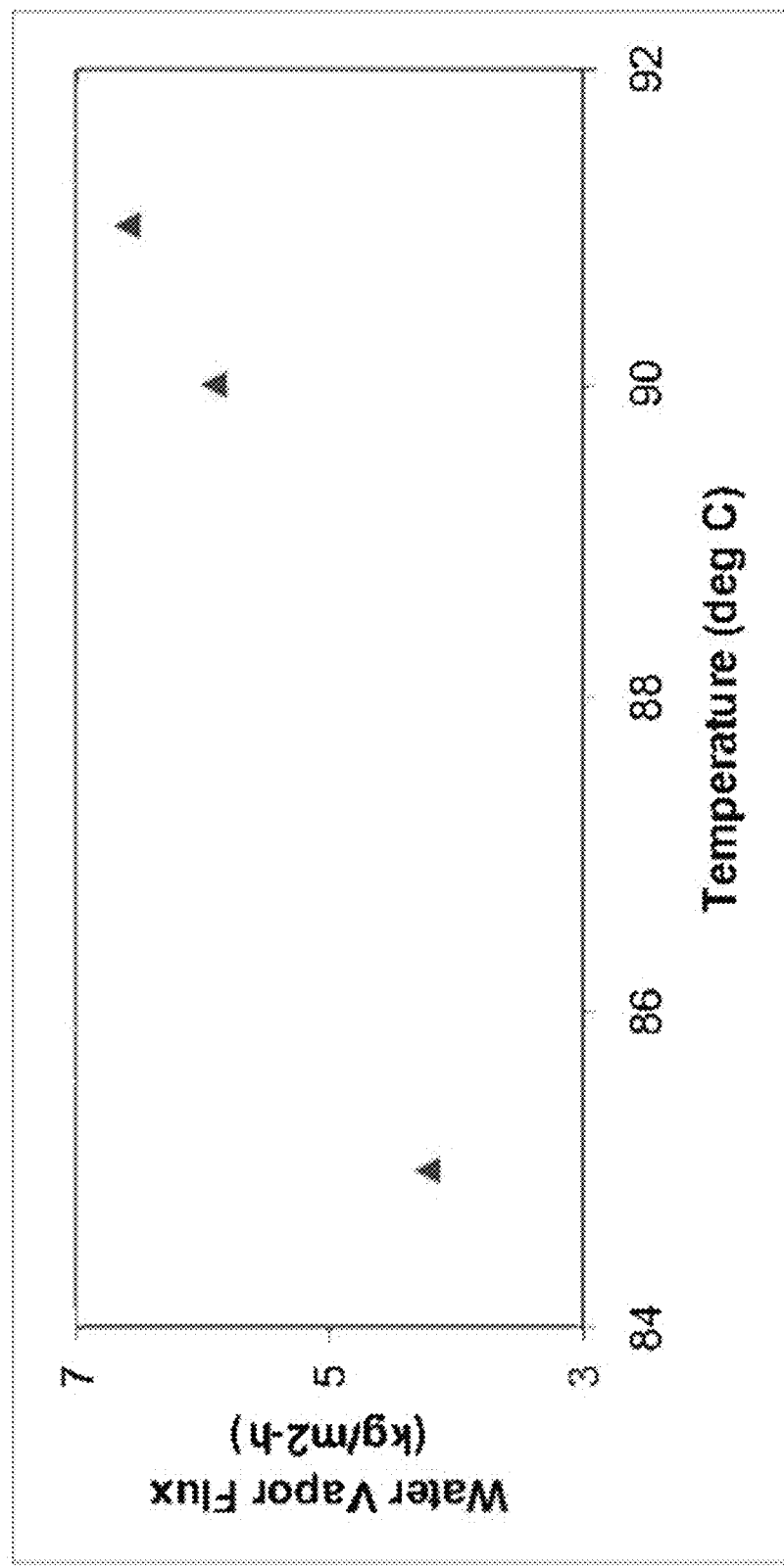
FIG. 9 is a chart showing change in water vapor flux with temperature of a simulated de-oiled produced water in small module #2 for a simulated produced water flow rate of 1,800 ml/min.

The performance of the small module #2 was studied with simulated de-oiled produced water at different temperatures. Water vapor flux increased from 4.2 $kg/m^2$-hr to 6.6 $kg/m^2$-hr as the feed temperature was increased from 85° C. to 91° C. (FIG. 9). Water vapor fluxes obtained with the simulated produced water were similar to those obtained with 1% NaCl solution. However, for the simulated produced water, the conductivity on the distillate side increased with time for different feed temperatures. After three hours, the conductivity became constant with time irrespective of the feed water temperature. As observed in earlier studies with Chevron-supplied produced water (Singh et al. [21]), the distillate side conductivity increase had very little to do with salt leakage or pore wetting. It was primarily due to dissolved $CO_2$ coming to the distillate water from bicarbonates in the feed solution dissociating at the higher temperatures as has been already described in Singh et al. [21] and He et al. [16].

DCMD Performances of Larger Membrane Modules

It is useful to note at the beginning the values of the membrane surface area per unit volume for the three larger membrane modules based on the fiber outside diameter. As Table 1 shows, these are 1120, 1120, 1526 $m^2/m^3$ for Modules I, II and III, respectively. These are a few times larger than that of the rectangular modules used in earlier pilot plant studies (Song et al., 2008) [13]; the surface area for module III is almost 4 times larger. Two module configurations were tested in so far as brine introduction is concerned. In Dead-End Mode, hot brine is fed through the bore of the 1.27 cm diameter central feed distribution tube, and is emitted radially through the holes in the wall to flow radially across the porous hollow fibers and out from the shell side. The other end of the central distribution tube is closed. In Spilt-Flow Mode, hot brine is introduced from both ends of the central distribution tube.

Figure 10:
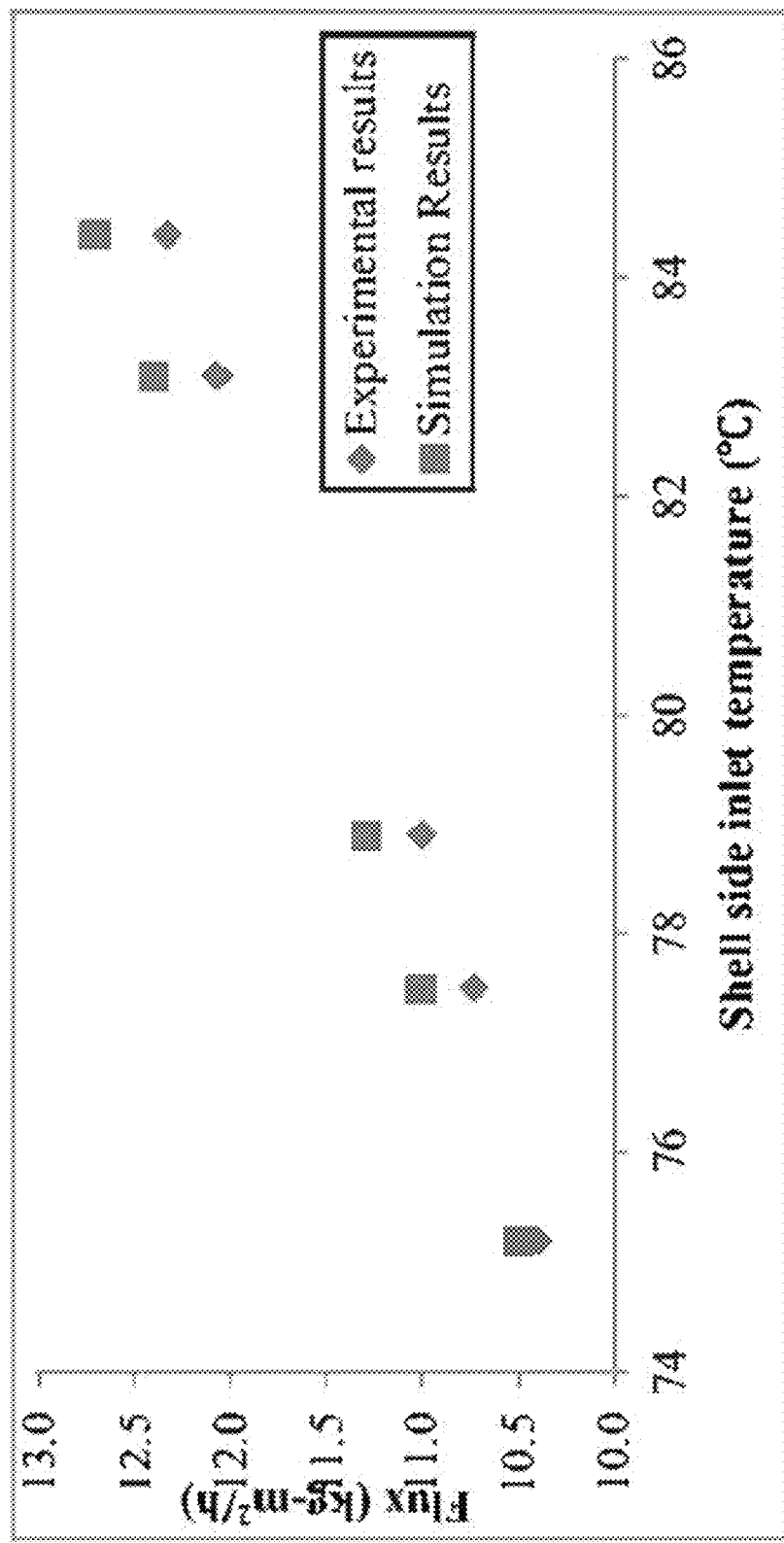
FIG. 10 is a chart showing experimental and simulation results of water vapor flux for the large module III.
Figure 11:
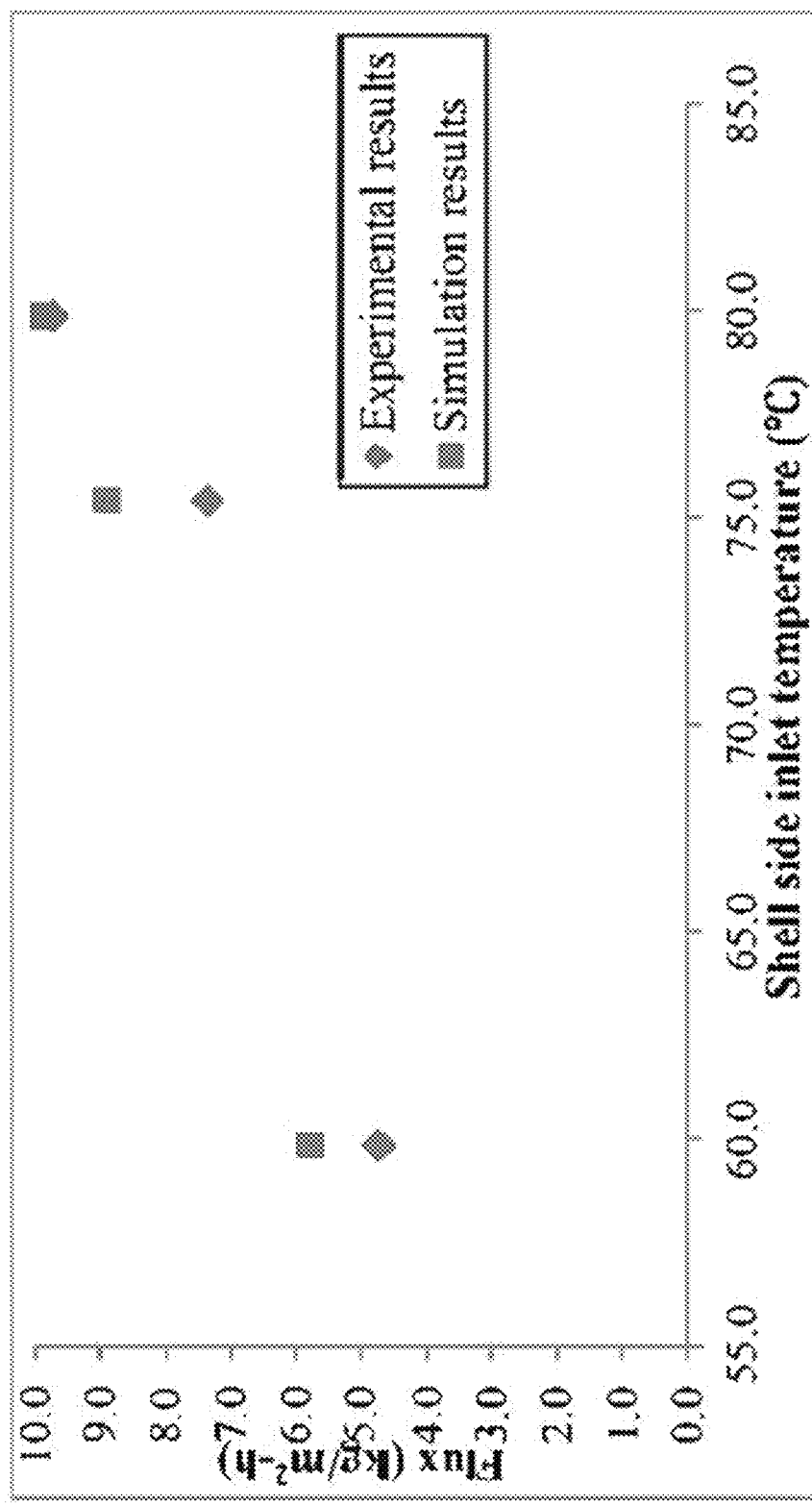
FIG. 11 is a chart showing experimental and simulation results of water vapor flux for the large module III.

In FIG. 10, the experimental flux results for the large module III are shown as a function of brine inlet temperature varying from 75.2 to 84.4° C. in Dead-End Mode of operation; the brine flow rate was 18 L/min, and the inlet brine temperature was varied between 75.2-84.4° C. Distillate flowed concurrently with brine flow direction in the CFT. The distillate was fed at 23.9-24.8° C. and 2.5 L/min. FIG. 11 illustrates the experimental results for the same system for a lower brine flow rate of 15 L/min and a lower brine inlet temperature range of 59.9-79.9° C. The water vapor fluxes are slightly lower due to lower brine velocity and lower brine inlet temperature. These data were taken in the larger experimental setup. Distillate side conductivity was constant indicating that there was no salt leakage from the brine side to the distillate side through the hollow fiber pores.

Figure 12:
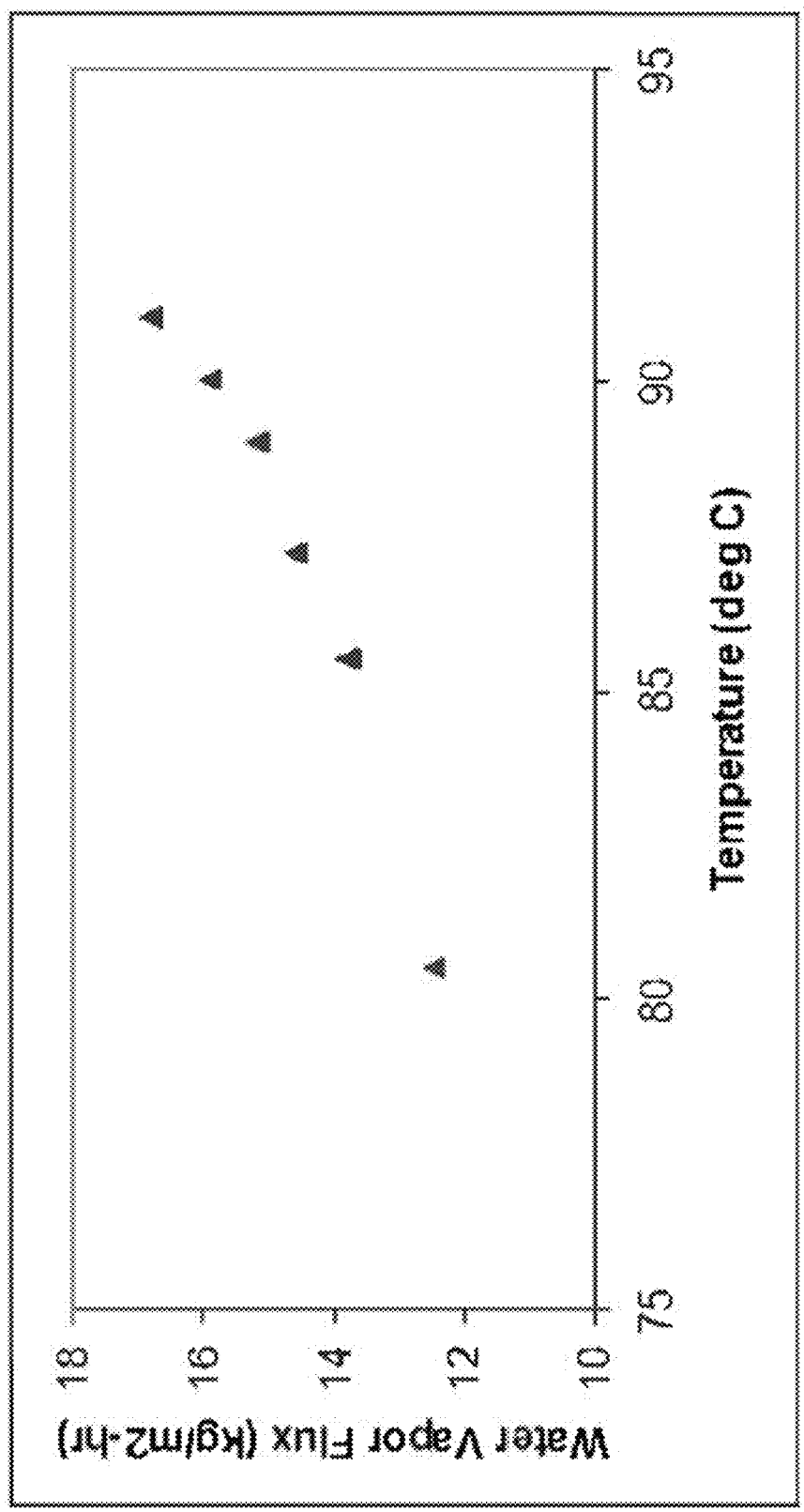
FIG. 12 is a chart showing variation of water vapor flux with temperature for large module I.

FIG. 12 illustrates experimental data of the large module I in Split-Flow Mode at a brine flow rate of 18 L/min in the range of 80 to 91° C. for brine-in temperature. Distillate-in temperature was maintained at ~22° C. for a flow rate of 0.9 L/min. Water vapor flux increased from 12.5 $kg/m^2$-hr to 16.8 $kg/m^2$-hr as the brine-in temperature was increased from 80.5° C. to 91° C. Brine-in pressure was around 27.56 kPag (4 psig) during all experiments at the flow rate of 18 L/min.

Modeling of DCMD Performances of Large Membrane Modules

Figure 13:
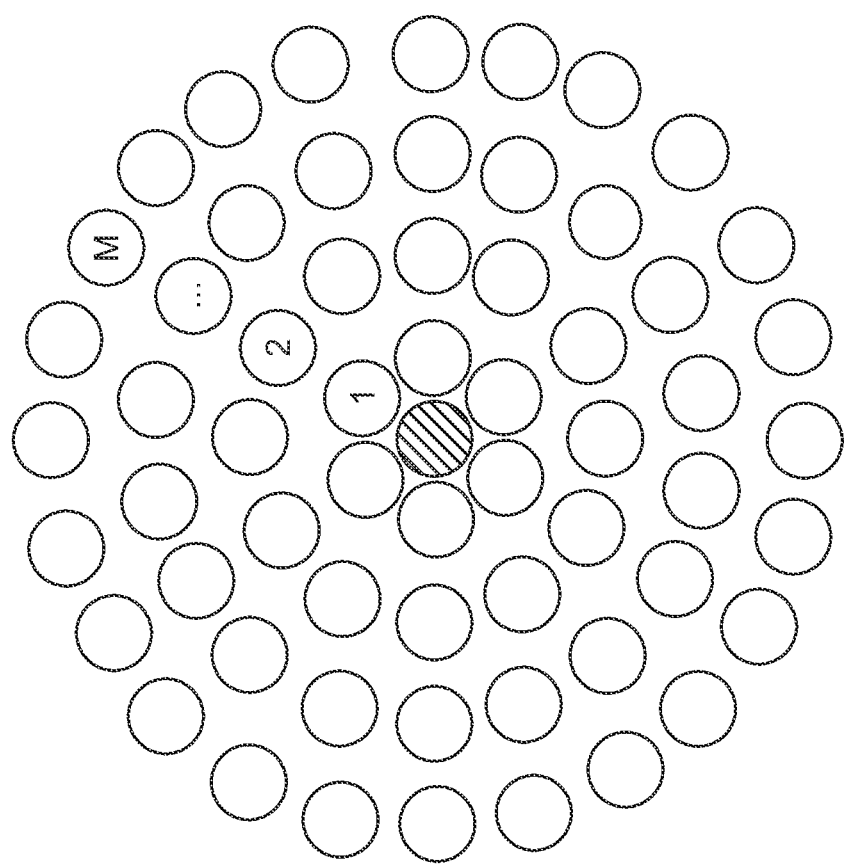
FIG. 13 is a schematic illustration of an arrangement of hollow fibers in the larger DCMD module.

The performance modeling is focused on a radial cross flow hollow fiber membrane module. Sengupta et al. (1998) [22] modeled degassing of water flowing radially and counter-currently on the shell-side due to the presence of a baffle; there was no modeling involved on the permeate side. Appropriate equations have been developed for a mathematical model of direct contact membrane distillation with the hot brine entering in the dead end mode. First consider the pattern of hollow fibers in circles around the central core tube (shaded) bringing in the hot brine (FIG. 13) which spreads out radially throughout the fiber bundle. In any such fiber bundle, focus on one hollow fiber in one particular layer. The various terms needed for mass and energy balances around one hollow fiber at a local section at a distance of x from the distillate entry point are given below (see notation).

Consider now a differential slice of the DCMD module with radius $r_j$ and radial width $dr_j$ identified as the $j^{th}$ fiber layer. The area of this annulus is approximately $2\pi r_j dr_j$. The number of hollow fiber $dn_j$ inside this slice is obtained from relations (2a) and (2b) given below:

$$dn_j = \frac{f_p(2\pi r_j dr_j)}{\frac{\pi}{4}d_o^2} = \frac{8 f_p r_j dr_j}{d_o^2} \quad (2a)$$

$$n_j = \frac{4 f_p}{d_o^2} r_j^2 \quad (2b)$$

Therefore, in the circle of radius $r_j$ the number of hollow fibers located with their center at radius $r_j$ is $n_j$. Here $f_p$ is the fractional packing density of N number of hollow fibers (of diameter $d_o$) in the shell side of diameter $d_s$ (around the central core tube of diameter $d_t$); it is defined as $$f_p = \frac{N\frac{\pi}{4}d_o^2}{\frac{\pi}{4}d_s^2 - \frac{\pi}{4}d_t^2} = \frac{Nd_o^2}{d_s^2 - d_t^2} \quad (3)$$

As the value of $r_j$ increases, the number of fibers in that layer increases with the square of the radius of the radial location.

Mass Balance on jth Layer with $n_j$ Number of Hollow Fibers

Figure 14:
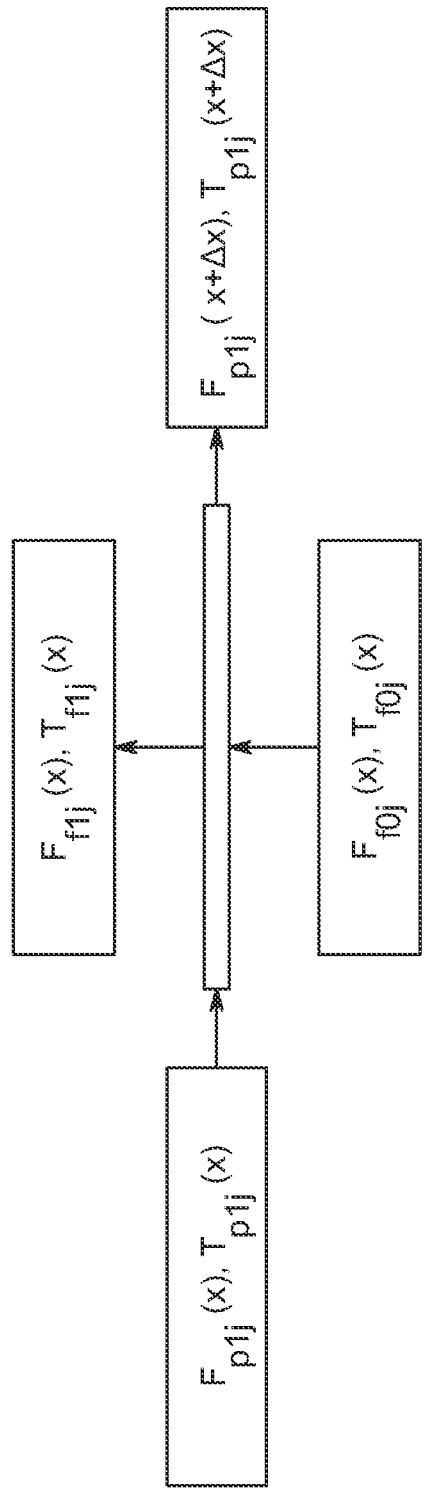
FIG. 14 is a mass and energy balance equation for the length of $\Delta x$ in the distillate flow direction.

The difference in the distillate mass flow rate in the $j^{th}$ layer of fibers is equal to the difference in brine mass flow rate over the $j^{th}$ layer of hollow fibers (see FIG. 14) (Note: Distillate flow is here co-current with brine flow direction in CFT):

$$\int_0^L [N_{v,j}(X)] n_j \pi d_{ln} dx = \dot{m}_d \bigg|_{x=L} - \dot{m}_d \bigg|_{x=0} = \rho(F_{d,at} - F_{d,in})\bigg|_j \quad (4)$$

$$= \dot{m}_f |_{j-1} - \dot{m}_f |_j = \rho(F_{f,in} - F_{f,at})\bigg|_j \quad (5)$$

Here $d_{ln}$ is defined as:

$$d_{in} = \frac{d_o - d_i}{\ln\left(\frac{d_o}{d_i}\right)} \quad (6)$$

Further $N_{v,j}(x)$ is the water vapor mass flux in the $j_{th}$ layer with $n_j$ number of hollow fiber at any x and $k_m$ is the water vapor mass transfer coefficient through the membrane:

$$N_{v,j}(x) = k_m(P_{fm,j}(x) - P_{pm,j}(x)) \quad (7)$$

Here the water vapor partial pressures $P_{fm,j}(x)$ and $P_{pm,j}(x)$ can be expressed using Antoine equation (Smith et al., 2001) [23]:

$$P_{fm,j}(x) = 10^3 \exp\left(16.260 - \frac{3799.89}{T_{fm,j}(x) + 273.15 - 46.8}\right) \quad (8)$$

$$P_{pm,j}(x) = 10^3 \exp\left(16.260 - \frac{3799.89}{T_{pm,j}(x) + 273.15 - 46.8}\right) \quad (9)$$

Heat Balance on jth Layer with $n_j$ Number of Hollow Fibers

The heat gain rate of distillate is equal to the heat loss rate of brine:

$$\int_0^x dQ(x)|_j = C_p[\dot{m}_d(x)T_d(x) - \dot{m}_d(0)T_d(0)] \quad (10)$$

$$= \frac{1}{x}C_p \int_0^x ([\dot{m}_f(x)T_f(x)]|_{j-1} - [\dot{m}_f(x)T_f(x)]|_j)dx \quad (11)$$

Shell Side Brine Heat Transfer $$\frac{dQ(x)}{dx}\bigg|_j = h_{f,j}n_j\pi d_o(T_{fo,j}(x) - T_{fm,j}(x)) \quad (12)$$

The heat transfer coefficient $h_{f,j}$ in the brine side could be expressed based on ukauskas equation (ukauskas, 1987)[24] for given values of $Re_o$ and $Pr_o$ (Song et al., 2007)[12]:

$$Nu_{f,j} = \frac{h_{f,j}d_o}{k_o} = 104Re_o^{0.4}Pr_o^{0.36}\left(\frac{Pr_o}{Pr_w}\right)^{0.25}F_c \quad (Re < 40) \quad (13)$$

$$Nu_{f,j} = \frac{h_{f,j}d_o}{k_o} = 0.71Re_o^{0.5}Pr_o^{0.36}\left(\frac{Pr_o}{Pr_w}\right)^{0.25}F_c \quad (Re > 40) \quad (14)$$

Where $$Re_o = \frac{d_o u_{o,j}\rho_o}{\mu_o}, Pr_o = \frac{C_{po}\mu_o}{k_o}; Pr_w = \frac{C_{pw}\mu_w}{k_w} \quad (15a)$$

$$u_{o,j} = \frac{F_{f,j}}{3600} \times \frac{1}{\pi d_j L - n_j \pi d_o L} \quad (15b)$$

Tube Side Distillate Heat Transfer $$\frac{dQ(x)}{dx}\bigg|_j = h_p n_j \pi d_i(T_{pm,j}(x) - T_{pl,j}(x)) \quad (16)$$

The distillate heat transfer coefficient $h_p$ is based on the 'Seider-Tate' equation (Seider and Tate, 1936)[25]:

$$Nu_p = \frac{h_p d_i}{k_i} = 1.86\left(\frac{d_i}{L}\right)^{0.33}(Re_i Pr_i)^{0.33}\left(\frac{\mu_i}{\mu_{wi}}\right)^{0.14} \quad (17)$$

$$Re_i = \frac{d_i u_i \rho_i}{\mu_i}; Pr_i = \frac{C_{pi}\mu_i}{k_i} \quad (18a)$$

$$u_i = \frac{F_d}{3600} \times \frac{1}{\frac{N\pi}{4}d_i^2} \quad (18b)$$

Heat Transfer Across the Hollow Fiber Membrane $$\frac{dQ(x)}{dx}\bigg|_j = \quad (19)$$

$$h_m n_j d_{ln}(T_{fm,j}(x) - T_{pm,j}(x)) + N_{v,j} n_j \pi d_j(\Delta H_v(T_{pm,j}(x) + C_{p,j}T_{pm,j}(x))$$

Where $$N_{v,j} = \frac{\int_0^L [N_{v,j}(x)]dx}{L} \quad (20)$$

From the relations given above, one can get the following:

$$\dot{m}_f|_{j+1}(x) = \dot{m}_f|_j(x) - N_{v,j}n_j\pi d_{ln}L \quad (21)$$

$$T_f|_{j+1}(x) = \frac{m_j C_P T_f|_j(x) - \left(\frac{dQ}{dx}\right)\big|_j}{(m_j - N_{v,j}n_j\pi d_{ln}L)C_p} \quad (22)$$

Given the flow rate and temperature of brine and distillate in the $j^{th}$ layer at any x, the values of $T_{fm,j}(x)$, $T_{pm,j}(x)$, $T_{pl,j}(x)$, (x), and $F_{pl,j}(x)$ can be calculated from the equations given above, along with the boundary condition $Q(0)I_j=0$ using MATLAB. This assumes that the heat transfer coefficients on the brine side and the distillate side are known. The values of $T_{fl,j}(x)$, $Q(x)I_j$, $P_{fm,j}(x)$, $P_{pm,j}$ (x) and $F_{bo}$ (x) can then be solved. A detailed notation section has been provided.

Simulations of the hollow fiber DCMD module performance in rectangular cross-flow were carried out earlier by Song et al. (2008) [13]. Those simulations had only one adjustable parameter namely, $k_m$, the membrane water vapor mass transfer coefficient; its values are available in Sirkar and Song (2009) [26]. In the simulations carried out here, $k_m$ is also the only adjustable parameter. Table 2 lists the values used which are not too far apart from those used by Sirkar and Song (2009)[26]. The modeling used the input values $V_{b0}$, $T_{b0}$, $V_{d0}$, $T_{d0}$, and the details of the module geometry and fiber dimensions and properties.

TABLE 2

Values of the parameters used in model simulations for Dead-End Mode

| | |
|---|---|
| Reference Temperature $T_0$ | 273.15 K |
| Liquid water heat capacity, $C_p$ | 4.1863 kJ/kg-C |
| Liquid water density | 1 g/cm³ |
| Latent heat of evaporation | 2257 kJ/kg |
| Thermal conductivity for polypropylene, $k_{pp}$ | 0.17 W/m-K |
| Thermal conductivity for air, $k_{air}$ | 0.025 W/m-K |
| Mass transfer coefficient $k_m$ for large module I | 0.0017 kg/m²/h/Pa |
| Mass transfer coefficient $k_m$ for large module III | 0.0033 kg/m²/h/Pa |

Comparison of Simulation Results with Experimental Results

The model illustrated above was based on the hot brine fed at one end of the central tube in the Dead-End Mode. In FIG. 10, simulation results for the large module III are compared with experimental results of water vapor flux as a function of the brine temperature varying over 75.2-84.4° C. in this particular mode of operation i.e., the brine flow rate of 18 L/min in Dead-End Mode. Further, the distillate flow direction was concurrent with respect to the brine flow direction in the CFT. The distillate coming in at 23.9-24.8° C. had a flow rate of 2.5 L/min. The simulation results are somewhat higher but not too far from the observed results. FIG. 11 illustrates the corresponding scenario for a lower feed brine flow rate of 15 L/min at a lower brine temperature. Here also the simulation results are somewhat higher than the experimentally observed values but not too far apart. The value of $k_m$ used for the large module III (see Table 2) is close to the value of 0.0028 kg/m²/h/Pa used by Sirkar and Song (2009)[26].

Figure 15:
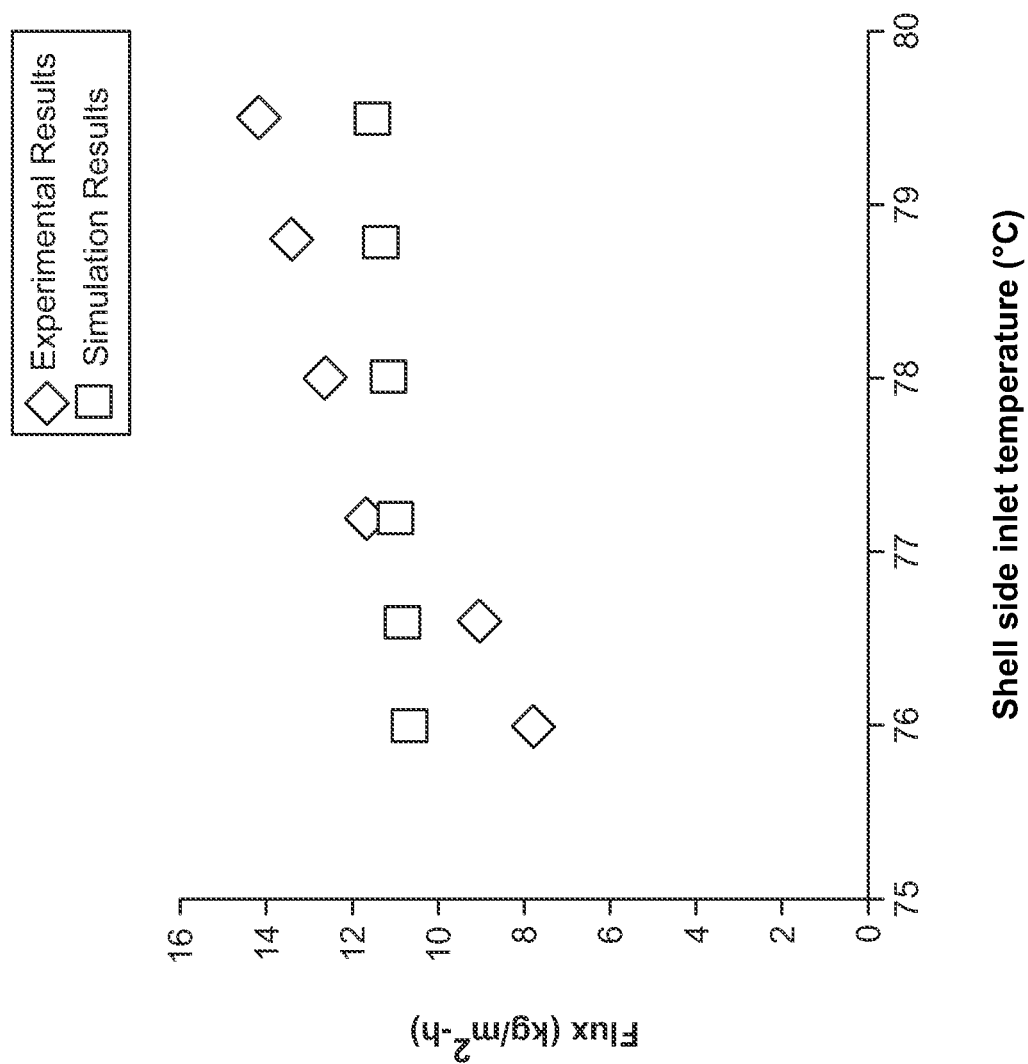
FIG. 15 is a chart showing experimental and simulation results for large module III.

The simulation results for the Dead-End Mode were compared in FIG. 15 with the data obtained from the large module III in Split-Flow Mode at a shell-side brine flow rate of 18 L/min and a brine inlet temperature of 76-80° C. If the performances of the module in two different feed brine flow configurations are compared in one embodiment at around 80° C. for a brine flow rate of 18 L/min, the Split-Flow mode provided a somewhat higher water vapor flux than the Dead-End mode. However, little difference at lower feed brine temperatures was observed. The Split-Flow mode does provide a more uniform brine flow distribution on the shell side and therefore a better performance.

It is important to note from these figures that the simulation results obtained in the dead-end mode are significantly higher than the observed values at lower brine temperatures; however at higher temperatures the simulation results appear to be closer to the experimental values. This deviation is due to a weak temperature dependence of the adjustable parameter $k_m$; lower $k_m$ values used for lower feed brine temperatures would bring the simulation results closer to the experimentally observed values at lower temperatures.

Figure 16:
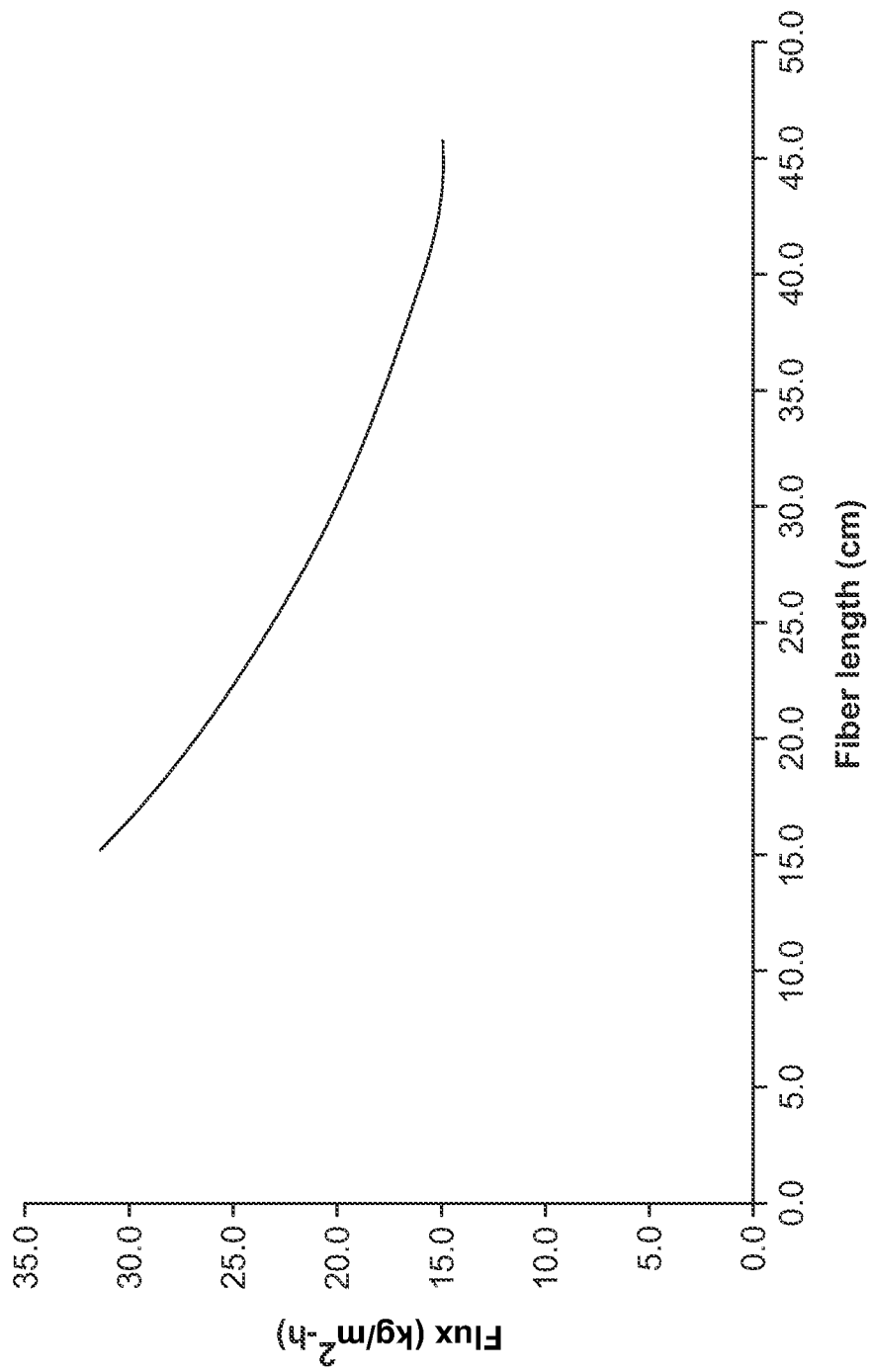
FIG. 16 is a chart showing simulation results of flux vs. fiber length for large module III.

It is useful to explore the effects of the length of the hollow fibers in such a module via simulations in Dead End mode. The large module III used here has an effective fiber length of 45.7 cm. It will be understood that other fiber lengths could be used. FIG. 16 illustrates the water vapor flux as a function of the hollow fiber length. Table 3 provides numerical values of a variety of relevant quantities. These calculations show that as the hollow fiber length is reduced, water vapor flux is increased considerably while the distillate outlet temperature rise is reduced, contributing to an increase in the flux. For a perspective, the simulation results shown in FIG. 16 can be compared with the performance of rectangular cross-flow modules having a length of 24.1 cm of the hollow fibers used in pilot plant studies (Song et al., 2008[13]). The simulations of FIG. 16 suggest a flux of 24.5 kg/m²-h; this value is close to the pilot plant data for the feed brine temperature range being considered.

TABLE 3

Detailed temperature and flux information for large module III simulations per FIG. 16.

| Fiber length (cm) | Fiber length (inch) | $T_{bi}$ (° C.) | $T_{bo}$ (° C.) | $T_{di}$ (° C.) | $T_{do}$ (° C.) | Flux (kg/m²-h) |
|---|---|---|---|---|---|---|
| 45.7 | 18 | 79.5 | 74.0 | 25.2 | 32.5 | 14.9 |
| 43.2 | 17 | 79.5 | 74.0 | 25.2 | 32.2 | 15.0 |
| 40.6 | 16 | 79.5 | 74.1 | 25.2 | 31.9 | 15.7 |
| 38.1 | 15 | 79.5 | 74.1 | 25.2 | 31.5 | 16.6 |
| 35.6 | 14 | 79.5 | 74.2 | 25.2 | 31.1 | 17.5 |
| 33.0 | 13 | 79.5 | 74.3 | 25.2 | 30.6 | 18.7 |
| 30.5 | 12 | 79.5 | 74.4 | 25.2 | 29.9 | 19.9 |
| 27.9 | 11 | 79.5 | 74.5 | 25.2 | 29.1 | 21.3 |
| 25.4 | 10 | 79.5 | 74.6 | 25.2 | 28.3 | 22.8 |
| 22.9 | 9 | 79.5 | 74.8 | 25.2 | 27.2 | 24.5 |
| 20.3 | 8 | 79.5 | 75.0 | 25.2 | 25.8 | 26.5 |

Simulations for Increased Fiber ID in Cylindrical Cross-Flow Fiber Modules

Figure 17A:
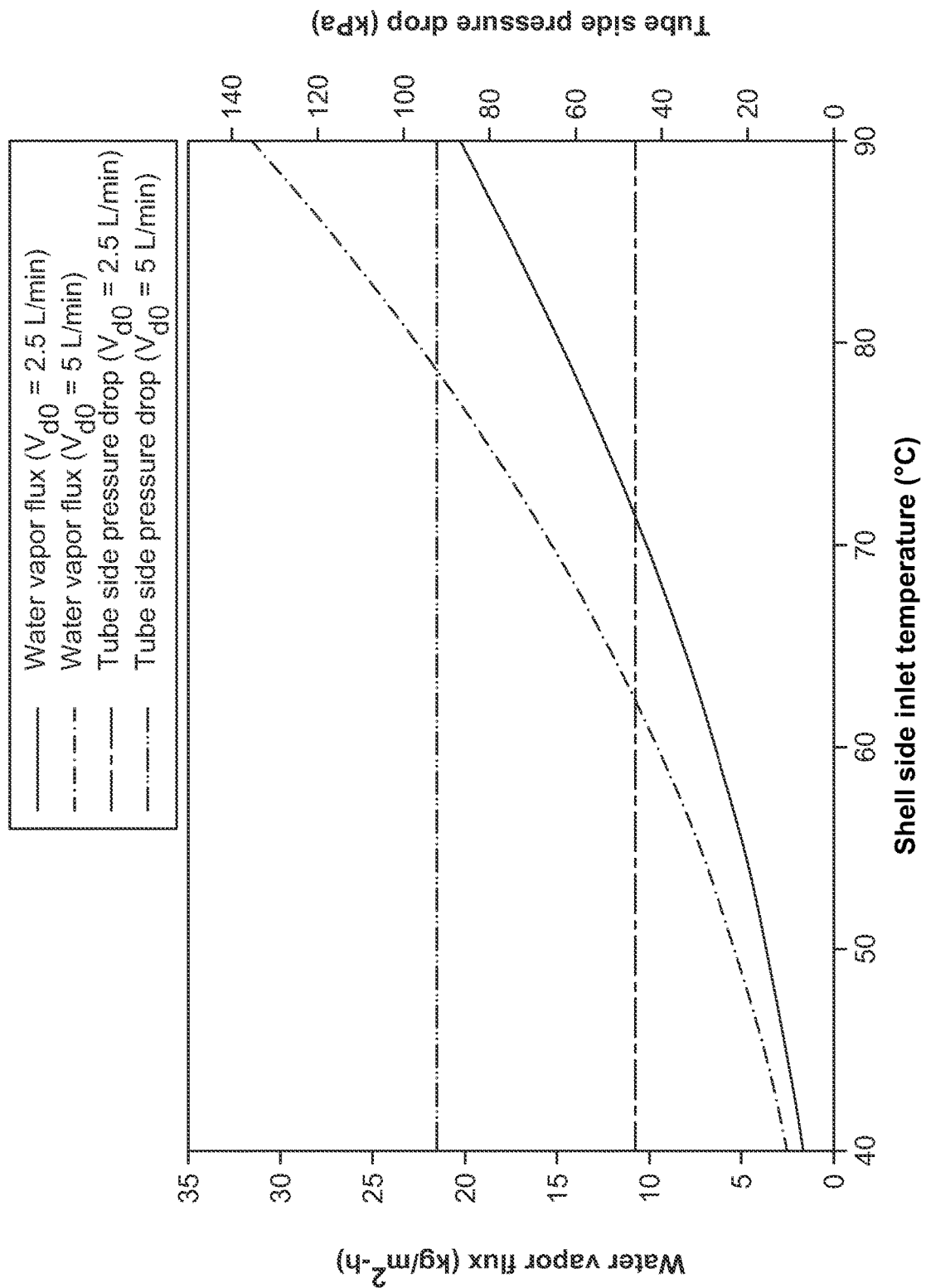
FIG. 17A is a chart showing predicted water vapor flux and tube side pressure drop vs. shell side inlet temperature at two sets of tube side flow rates.

Table 1 provides details of two large modules: module III studied so far and a hypothetical one, module IV, where the HFM ID is 692 µm (see PVDF hollow fibers). FIG. 17*a* illustrates predicted water vapor flux and tube side pressure drop for HFMs with $d_i/d_o$ being 330/630 µm. Water vapor flux increased with increasing tube side flow rate. The tube side pressure drop was 46.2 kPa (6.7 psi) for a distillate flow rate 2.5 L/min. It doubled to 92.5 kPa when distillate flow rate was doubled to 5 L/min. However, modeling with fibers (Table 1) having $d_i/d_o$, 692/925 µm (FIG. 17*b*) shows much lower pressure drop; the figure also lists the predicted water vapor flux. NOTE: Tube side pressure drop was drastically decreased from 46.2 kPa to 5 kPa at $V_{d0}$=2.5 L/min; it decreased further from 92.5 kPa to 10.1 kPa at $V_{d0}$=5 L/min. Water vapor flux is still comparable to that from the fibers with $d_i/d_o$ values of 330/630 µm.

Figure 17B:
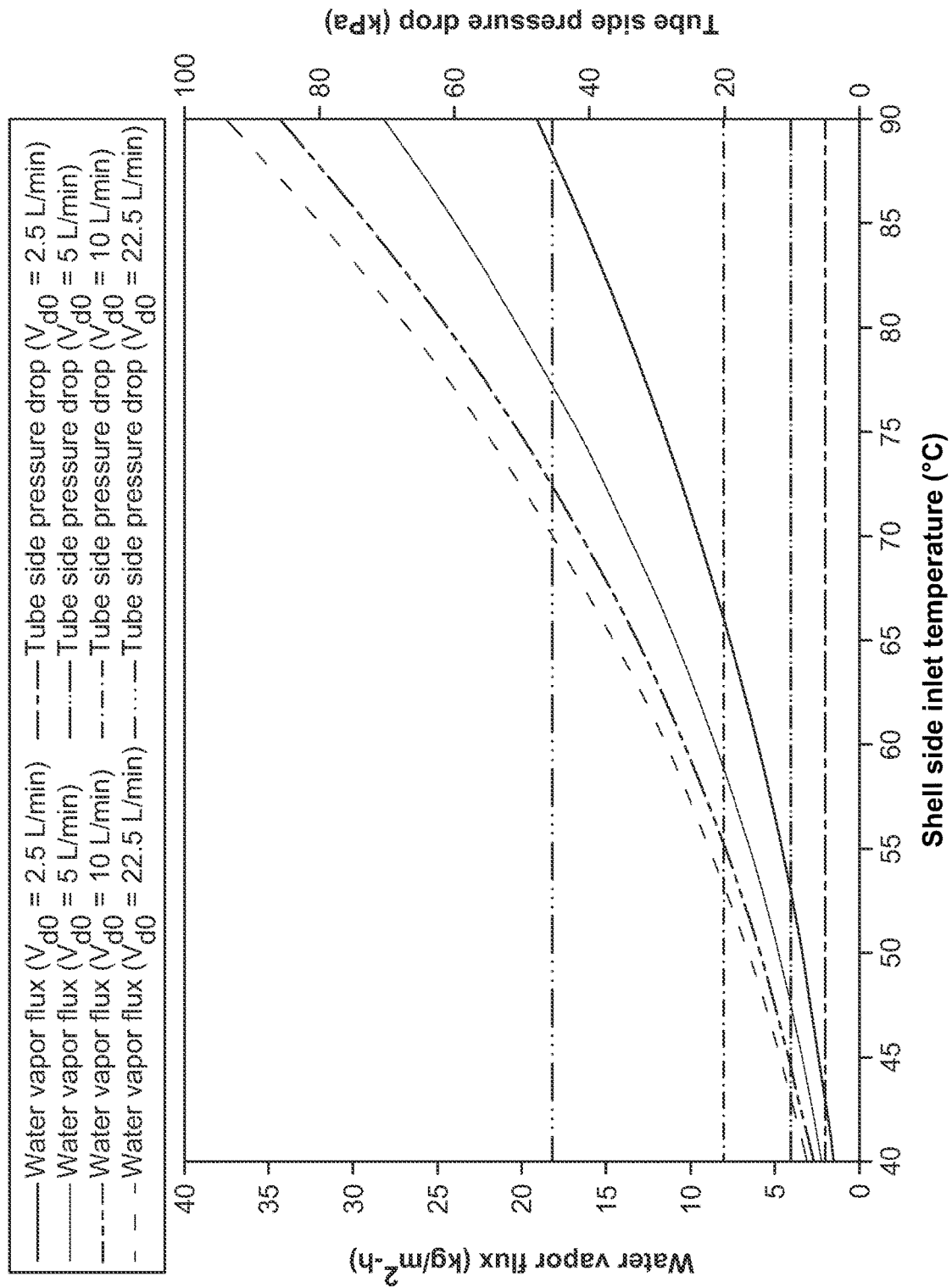
FIG. 17B is a chart showing predicted water vapor flux and tube side pressure drop vs. shell side inlet temperature at various tube side flow rates.

Larger tube side flow rates of $V_{d0}$=10 L/min and $V_{d0}$=22.5 L/min were also used for simulation with larger ID fibers (FIG. 17*b*). At $T_{bo}$=90° C., water flux was 34.4 kg/m²-h for $V_{d0}$=10 L/min with tube side pressure drop 20.2 kPa (2.9 psi); it was 37.6 kg/m²-h for $V_{d0}$=22.4 L/min with tube side pressure drop 45.5 kPa (6.6 psi). This is another advantage of higher tube-side flow rate: a lower distillate temperature increase results in substantially higher water vapor flux.

Figure 17C:
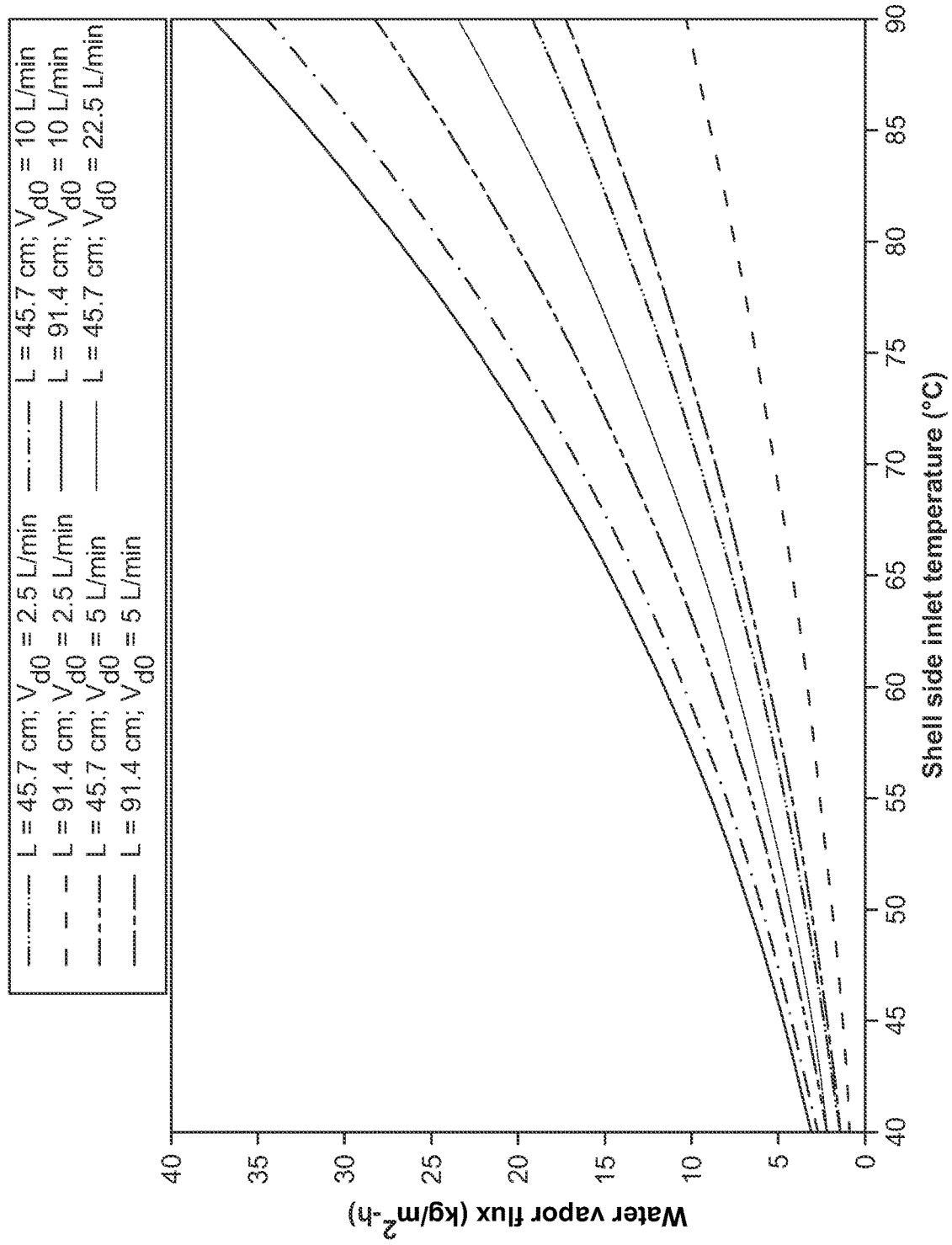
FIG. 17C is a chart showing predicted water vapor flux for different fiber lengths vs. shell side inlet temperature at various tube side flow rates.

The effects of fiber length on simulated water vapor flux for the larger ID HFM diameter are shown in FIG. 17*c*. At $T_{bo}$=90° C., as fiber length was doubled to 91.4 cm, water vapor flux decreased from 19.1 kg/m²-h to 10.3 kg/m²-h at $V_{d0}$=2.5 L/min: tube side pressure drop was 10.1 kPa (1.5 psi). At $V_{d0}$=5 mL/min, the value of water vapor flux decreased from 28.2 kg/m²-h and to 17.2 kg/m²-h, while tube side pressure drop was increased to 20.2 kPa (2.9 psi). The value of water vapor flux decreased from 34.4 kg/m²-h and to 23.4 kg/m²-h as fiber length was doubled at $V_{d0}$=10 L/min with a tube side pressure drop of 40.4 kPa (5.9 psi). This is attributed to the effectively lower temperature difference between the two sides of the HFM due to the longer retention time of distillate stream within the longer HFMs; therefore, the temperature of the distillate increased further. For a fiber length of 91.4 cm and flow rate 22.5 L/min, the tube side pressure drop was as high as 90.0 kPa (13.2 psi). Therefore, water vapor flux simulation was not performed.

Figure 17D:
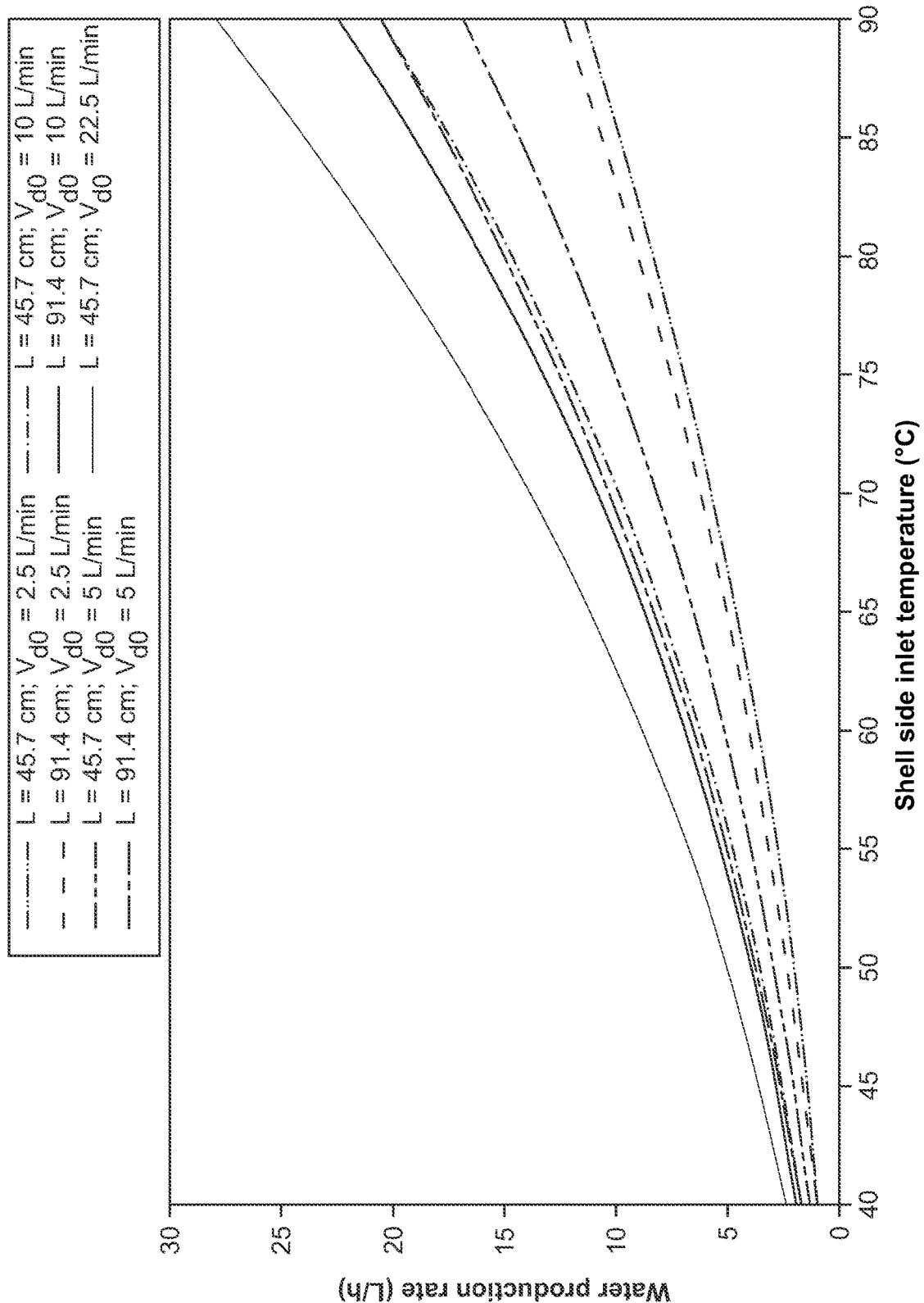
FIG. 17D is a chart showing predicted production rate across different fiber lengths vs. shell side inlet temperature at various tube side flow rates.

The simulated results of the effect of fiber length on the water production rate for HFMs with larger $d_i$, $d_o$ are shown in FIG. 17*d*. At $T_{bo}$=90° C., it is 22.4 L/h for $V_{d0}$=22.5 L/min, and 20.5 L/h for $V_{d0}$=10 L/min for L=45.7 cm; it is 27.9 L/h for $V_{d0}$=10 L/min for a fiber length of 91.4 cm, and it was 16.8 L/h for $V_{d0}$=5 L/min. For a fiber length of 91.4 cm, it is 12.3 L/h for $V_{d0}$=5 L/min. An improved estimate of fiber properties and operating conditions are: $d_i$, 692 µm; $d_o$, 925 µm; N, 600; L, 94.1 cm; $V_{bo}$, 22.5 L/min; $V_{d0}$=10 L/min; $T_{bo}$, 90° C.; $T_{d0}$, 20° C., which will give water vapor flux of 23.4 kg/m²-h, water production rate of 27.9 L/h and a pressure drop of 40.4 kPa (5.9 psi). Compared to the experimental operation conditions (pressure drop 46.2 kPa, 6.7 psi), the water production rate will be 2.3 times higher.

Advantages of Cylindrical Cross-Flow Hollow Fiber Modules in DCMD

The HFM surface area packed in this new, compact and light-weight cylindrical module has a reasonable value of 1526 m²/m³ based on fiber OD; it is 4-5 times larger than that in the rectangular module depending on estimation based on the fiber OD or fiber ID. The cylindrical module can be easily scaled up to 10-20 cm shell diameter and accommodate a few times to more than an order of magnitude higher membrane surface area. Putting a large number of such modules together in a countercurrent cascade and for larger production rates should be straightforward. The shell-side design automatically sweeps away scaling salt precipitates. The best features of the rectangular cross-flow HFM modules have been retained; their cumbersome and costly design features inhibiting scale-up for higher production levels have been eliminated. Compared to 18 bolts and nuts used in each module used for pilot plant studies (Song et al. [13]), the cylindrical modules need just a few pipe fittings and a few Phillips screws allowing rapid assembly.

There is an additional specific advantage of the Split-Flow Mode of operation when the cylindrical cross-flow modules are coupled together in a countercurrent cascade (Lee et al., 2011) [5]. The cooled brine exiting through two shell-side outlets of a module operating at a higher temperature in the cascade can easily enter the next module operating at a lower temperature in the cascade from the two sides of the central feeding tube.

Thermally driven membrane distillation-based desalination is becoming attractive especially for concentrated saline waters having scaling salts. Although a rectangular module with crossflow of hot brine over hydrophobic porous hollow fibers of PP having a porous fluorosiloxane coating demonstrated extraordinary DCMD performance and resistance to fouling by scaling precipitates, it had a low surface area per unit volume and posed scale-up problems. A cylindrical hollow fiber device has been developed having a surface area per unit volume of 1526 $m^2/m^3$ which is about four times that of the rectangular modules developed earlier. It can be scaled up easily to larger diameters to large diameters and high membrane surface areas.

The module has been operated with the hot brine coming into the shell side through a central feed tube either from one end (dead-end mode) or from both ends (split-flow mode) and going radially out. The results of numerical simulations of a model developed for the dead-end mode provide a reasonable description of the observed water vapor flux variation with hot brine inlet temperature when the module is operated in the dead-end operational mode. The split-flow mode provides a slightly higher flux. The hollow fiber length of 45.7 cm in the largest module in one embodiment is almost twice that of the length of the largest rectangular module studied earlier. Simulations of the model show that the membrane water vapor flux performance in embodiments is in line with what was observed with the largest rectangular modules studied earlier in a pilot plant. Simulations further show that larger ID hollow fibers will reduce the distillate-side pressure drop drastically, accommodate a much higher distillate flow rate leading to higher fluxes and a higher water production rate per module with longer HFMs.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A method for desalination of liquid brine, comprising:
   (a) providing a membrane distillation module having:
      (i) a housing with a substantially cylindrical wall and first and second ends together defining a chamber with an axis passing through the first and second ends;
      (ii) a delivery conduit extending into said chamber, and having a first inlet opening to a lumen of said delivery conduit, the first inlet positioned external to said chamber, and an outlet opening to the lumen and positioned in said chamber;
      (iii) a membrane formed by a plurality of unbundled porous hydrophobic hollow fibers in said chamber, lumens of said hollow fibers forming a tube side of the chamber;
      (iv) a first potting for securing first ends of said hollow fibers, and forming a first sealed end of said chamber;
      (v) a second potting for securing second ends of said hollow fibers, and forming a second sealed end of said chamber; a chamber volume external to said hollow fibers and said delivery conduit and between the first and second sealed ends of the chamber forming a shell side of the chamber in which shell side fluid is contained by and between the first and second sealed ends;
      (vi) a shell side port in said housing opening to the shell side of said chamber, said shell side port disposed between the first and second sealed ends;
      (vii) a first tube side port in said housing opening to a first plenum that is in fluid communication with the tube side of said chamber through said first potting; and
      (viii) a second tube side port in said housing opening to a second plenum that is in fluid communication with the tube side of said chamber through said second potting;
   (b) flowing the liquid brine at a first temperature through the shell side of the chamber; and
   (c) flowing a second liquid at a second temperature through the tube side of the chamber, wherein the first temperature is higher than the second temperature.

2. The method as in claim 1, including flowing the second liquid to the tube side of the chamber through one of said first and second tube side ports.

3. The method as in claim 1, including flowing the liquid brine to the shell side of the chamber through the outlet of the delivery conduit.

4. The method as in claim 3 wherein said membrane separates the tube side of the chamber from the shell side of the chamber.

5. The method as in claim 4 wherein the liquid brine passes over the hollow fibers in radial cross flow to pass desalinated water vapor through membrane pores of the membrane to the tube side of the chamber.

6. The method as in claim 1 wherein said delivery conduit extends axially through said chamber to define first and second axially opposed ends of the delivery conduit, and includes a second inlet opening to the delivery conduit lumen positioned external to said chamber and adjacent to the second end of the delivery conduit, wherein the first inlet is positioned adjacent to the first end of the delivery conduit.

7. The method as in claim 6, including flowing the brine into both of the first and second inlets of the delivery conduit, and through the outlet of the delivery conduit.

8. The method as in claim 7 wherein said delivery conduit extends axially through said first and second ends of said housing.

9. The method as in claim 1 wherein said delivery conduit includes a closed end axially opposite from a first end of the delivery conduit, adjacent to which first end is the inlet opening to the lumen of the delivery conduit.

10. The method as in claim 1 wherein said first and second ends of said housing include respective end caps that are removably engagable with said substantially cylindrical wall.

11. The method as in claim 10 wherein said end caps are removably engagable with said substantially cylindrical wall without separate fasteners.

12. The method as in claim 1 wherein a packing fraction of the plurality of porous hydrophobic hollow fibers in said chamber is less than 0.25.

* * * * *